(12) United States Patent
Wijffels et al.

(10) Patent No.: US 10,315,691 B2
(45) Date of Patent: Jun. 11, 2019

(54) METHODS AND APPARATUS TO CORRECT CLEAR VISION ERRORS IN A VEHICLE STEERING SYSTEM

(71) Applicant: Ford Global Technologies, LLC, Dearborn, MI (US)

(72) Inventors: Lodewijk Wijffels, Canton, MI (US); David Michael Russell, Ann Arbor, MI (US); Jeremy Alan Rawlings, Canton, MI (US); Attila Benak, Cologne (DE); Timothy Cannon, Millington, MI (US); Joseph Park, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

(21) Appl. No.: 15/474,744

(22) Filed: Mar. 30, 2017

(65) Prior Publication Data
US 2018/0281845 A1 Oct. 4, 2018

(51) Int. Cl.
*B62D 5/04* (2006.01)
*B62D 1/04* (2006.01)
(Continued)

(52) U.S. Cl.
CPC ............. *B62D 5/0484* (2013.01); *B62D 1/04* (2013.01); *B62D 1/181* (2013.01); *B62D 3/126* (2013.01); *B62D 15/02* (2013.01); *B62D 15/021* (2013.01)

(58) Field of Classification Search
CPC ................................................... B62D 5/0484
See application file for complete search history.

(56) References Cited

U.S. PATENT DOCUMENTS 6,186,267 B1    2/2001  Hackl et al.
6,390,505 B1 *  5/2002  Wilson ................... B62D 1/181
                                                       280/775
(Continued)

FOREIGN PATENT DOCUMENTS

EP    1935754       6/2008
JP    H09254804     9/1997
(Continued)

OTHER PUBLICATIONS

U.S. Appl. No. 14/948,806, "Methods and Systems for Controlling Steering Response and Steering Torque Feedback Based on Steering Position," filed Nov. 23, 2015, 33 pages.
(Continued)

*Primary Examiner* — Hussein Elchanti
*Assistant Examiner* — Michael A Berns
(74) *Attorney, Agent, or Firm* — Raymond Coppiellie; Hanley, Flight & Zimmerman, LLC

(57) ABSTRACT

Methods, apparatus, and articles of manufacture to correct clear vision errors in a vehicle steering system are disclosed. An example apparatus includes a first sensor and a second sensor to measure a current position of a steering column and a current position of a steering wheel in a vehicle steering system. The example apparatus further includes a non-uniformity manager to map the current position to an offset, and an active steering system to apply the offset to adjust the current position of the steering wheel to a nominal position of the steering wheel to compensate for a clear vision error.

20 Claims, 11 Drawing Sheets

(51) Int. Cl.
    *B62D 1/181*      (2006.01)
    *B62D 15/02*      (2006.01)
    *B62D 3/12*      (2006.01)

(56) References Cited

U.S. PATENT DOCUMENTS

| | | | |
|---|---|---|---|
| 6,637,284 B1 | 10/2003 | Gaeth | |
| 6,728,615 B1 | 4/2004 | Yao et al. | |
| 6,782,316 B2 | 8/2004 | Breed et al. | |
| 7,295,907 B2 * | 11/2007 | Lu | B62D 15/0235 |
| | | | 116/31 |
| 7,379,803 B2 | 5/2008 | Lim | |
| 7,950,274 B2 * | 5/2011 | Pattok | B62D 15/021 |
| | | | 73/117.02 |
| 8,452,493 B2 * | 5/2013 | Katch | B62D 5/0466 |
| | | | 701/41 |
| 8,532,876 B2 | 9/2013 | Igarashi et al. | |
| 8,676,450 B2 | 3/2014 | Kohara | |
| 9,031,745 B2 | 5/2015 | Bahena et al. | |
| 9,073,575 B2 | 7/2015 | Bryant | |
| 9,150,238 B2 | 10/2015 | Alcazar et al. | |
| 9,550,519 B2 * | 1/2017 | Shah | B62D 5/008 |
| 9,815,493 B2 * | 11/2017 | Bean | B62D 6/008 |
| 2008/0027609 A1 | 1/2008 | Aoki et al. | |
| 2009/0112405 A1 * | 4/2009 | Tamaizumi | B62D 5/0463 |
| | | | 701/42 |
| 2010/0292896 A1 * | 11/2010 | Watanabe | B62D 5/0466 |
| | | | 701/41 |
| 2013/0233117 A1 | 9/2013 | Read et al. | |
| 2013/0261894 A1 | 10/2013 | Kojima | |
| 2013/0317700 A1 | 11/2013 | Shah et al. | |
| 2014/0180541 A1 | 6/2014 | Yu et al. | |
| 2014/0277944 A1 | 9/2014 | Bean et al. | |
| 2014/0303848 A1 | 10/2014 | Bean et al. | |
| 2015/0239488 A1 | 8/2015 | Caverly et al. | |
| 2015/0291210 A1 | 10/2015 | Kageyama | |
| 2015/0360715 A1 | 12/2015 | Shimizu et al. | |
| 2017/0021862 A1 | 1/2017 | Akatsuka et al. | |

FOREIGN PATENT DOCUMENTS

| | | |
|---|---|---|
| JP | 2003205846 | 7/2003 |
| KR | 100968066 | 6/2010 |

OTHER PUBLICATIONS

United States Patent and Trademark Office, "Non-final Office Action," issued in connection with U.S. Appl. No. 14/948,806, dated Mar. 24, 2017, 24 pages.

United States Patent and Trademark Office, "Non-Final Office Action," issued in connection with U.S. Appl. No. 15/474,737, dated Jun. 26, 2018, 7 pages.

* cited by examiner

METHODS AND APPARATUS TO CORRECT CLEAR VISION ERRORS IN A VEHICLE STEERING SYSTEM

FIELD OF THE DISCLOSURE

This disclosure relates generally to vehicles and, more particularly, to methods and apparatus to correct clear vision errors in a vehicle steering system.

BACKGROUND

Due to space limitations in a vehicle, a motor cannot typically be mounted along a same axis as a steering system. Use of universal joints in the steering system facilitates transmission of torque between two non-collinear axes (e.g., implemented by the steering system and the motor). However, the universal joints also introduce a non-linearity in the steering system due to geometric location and angular behavior of the universal joints. This non-linearity contributes to deviations from an intended overall steering experience with respect to vehicle response and steering wheel torque feedback. For example, due to the physical geometry of the universal joints and shafts, where two components are linked by a universal joint at an angle, a rotation of the steering wheel may not be accurately translated by those components.

SUMMARY

Methods, apparatus, and articles of manufacture to identify non-uniformity in a vehicle steering system are disclosed. An example apparatus includes a first sensor and a second sensor to measure a current position of a steering column and a current position of a steering wheel in a vehicle steering system. The example apparatus further includes a non-uniformity manager to map the current position to an offset, and an active steering system to apply the offset to adjust the current position of the steering wheel to a nominal position of the steering wheel to compensate for a clear vision error.

Another example apparatus includes a first sensor and a second sensor to determine a non-uniformity angle associated with a steering column in a vehicle steering system. The example apparatus further includes a non-uniformity manager to map the non-uniformity angle to a current position of the steering column, and determine an offset based on the current position of the steering column. The example apparatus further includes an active steering system to apply the offset to adjust a current position of the steering wheel to a nominal position of the steering wheel to compensate for a clear vision error.

An example method includes determining a type of a steering column in a vehicle steering system, in response to determining the type is a manually adjustable type, determining a non-uniformity angle associated with the steering column, and mapping the non-uniformity angle to a current position of the steering column. The example method further includes mapping the current position of the steering column to an offset to adjust a current position of a steering wheel, and applying the offset to an active steering system to adjust the current position of the steering wheel to a nominal position of the steering wheel to compensate for a clear vision error.

BRIEF DESCRIPTION OF THE DRAWINGS

The figures are not to scale. Further, wherever possible, the same reference numbers will be used throughout the drawing(s) and accompanying written description to refer to the same or like parts.

DETAILED DESCRIPTION

Figure 1:
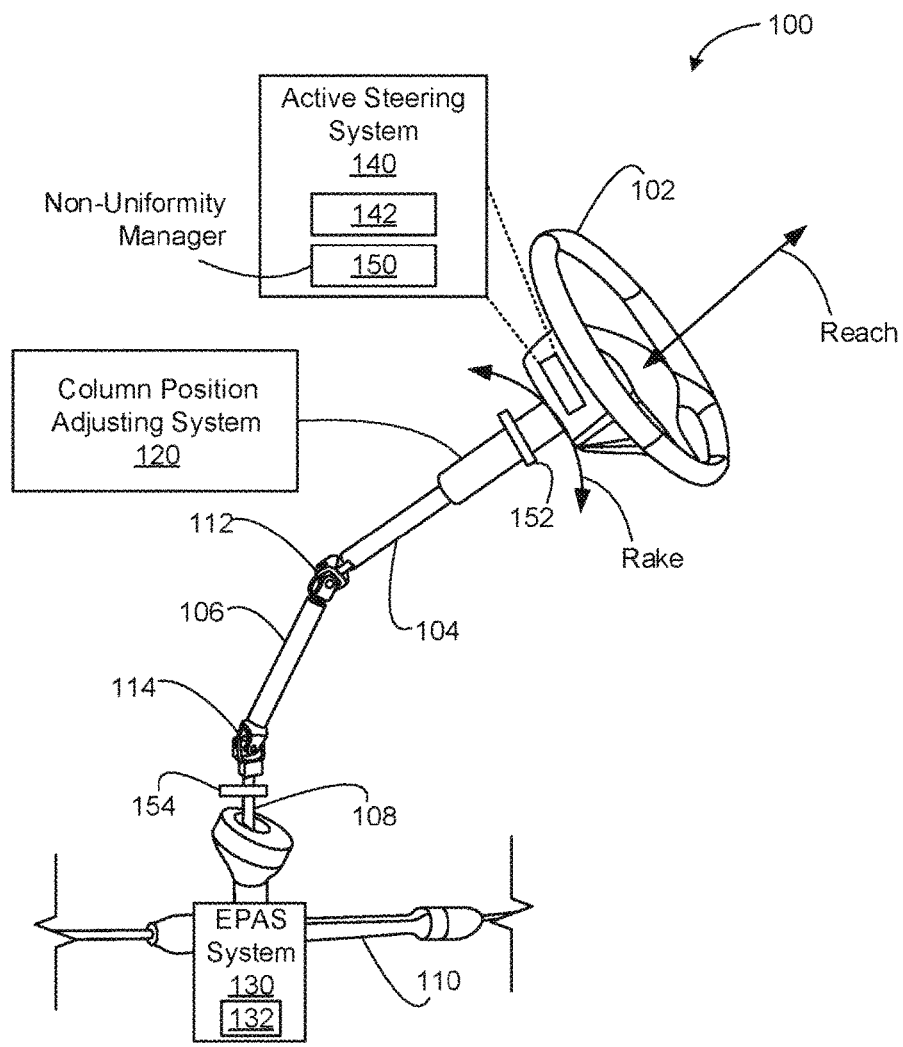
FIG. 1 is a block diagram of an example vehicle steering system within which the teachings of this disclose may be implemented.

In a vehicle steering system, universal joints or u-joints are typically used in connection with a steering column to transmit a rotational movement via shafts that are placed at an angle in the vehicle steering system. However, the use of universal joints introduces a variation (e.g., a periodic variation) or a non-uniformity in rotational velocity and torque that is provided from a steering wheel relative to the road wheels of the vehicle. The characteristic of the non-uniformity is influenced by angular differences of the universal joints and the relative angles of the center lines of the shafts (e.g., the geometry of the vehicle steering system). Such non-uniformity has an influence on the overall linearity of a vehicle response (e.g., a steering response) and torque feedback experienced by the driver. For example, a driver turning the steering wheel of the vehicle steering system at an angular velocity of 180 degrees per second expects the road wheels of the vehicle to turn at a corresponding or a proportionate angular velocity. Additionally, when a driver provides a torque to turn the steering wheel (e.g., 5 Newton-meters of force), the driver anticipates a torque feedback proportionate to the driver provided torque.

Non-uniformities, such as magnitude and/or phase relationship adjustments in vehicle response and torque feedback, may occur due to the use of universal joints in the vehicle steering system. While space constraints in a motor vehicle typically prevent the steering shaft of a steering rack from being mounted along the same axis as the steering column, universal joints enable developers of motor vehicles to permit transmission of steering function between two non-collinear axes (e.g., the steering shaft of a steering rack and the steering column). For example, the universal joints facilitate transmission of an angular velocity and a torque between the steering wheel and the road wheels coupled to a steering rack. However, the universal joints also introduce a variation (e.g., a non-uniformity) in the transmitted rotational velocity and the torque. The universal joints may also introduce a variation (e.g., a non-uniformity) in the alignment (e.g., linearity) of the steering wheel and the road wheels. For example, when the vehicle is traveling approximately straight, the steering wheel may appear to the driver to be slightly rotated and/or have a slight angle (e.g., a clear vision error angle).

As steering columns are adjustable in position (e.g., adjustable rake (e.g., up-or-down) position and/or adjustable reach (e.g., towards-or-away) position), the characteristic of a non-uniformity depends on an instant (e.g., current) position of the steering column. For example, the vehicle response linearity (e.g., the steering wheel and the road wheels turning at a proportionate angular velocity with respect to each other) and the torque feedback depend on the rake position and the reach position of the steering column. As used herein, the term "steering column position" refers to a rake position and a reach position of a steering column.

Traditionally, manufacturers of motor vehicles develop their motor vehicles with the steering column in a nominal position to provide the driver with an intended steering experience. However, in some examples, the steering column in the nominal position includes non-uniformities, but the non-uniformities are designed to be acceptable to the driver. While the steering column is in the nominal position (sometimes referred to herein as a mid-mid position, a reference position, or a default position), the steering wheel and the road wheels function according to the desired nominal behavior in both vehicle response and torque feedback.

However, if the driver adjusts the steering column and/or the steering wheel from the nominal position, the geometric effect of the change due to the universal joints may change a magnitude and/or a phase relationship of the vehicle response and the torque feedback experienced by the driver from the desired nominal behavior. For example, a driver may experience more steering response (and different steering wheel torque feedback) or less steering response (and different steering wheel torque feedback) when the driver adjusts the steering column position from the nominal position. A measure of rotational velocity and/or a measure of torque feedback at the adjusted steering column position may represent a change in variation or a change in non-uniformity with respect to the nominal position. Thus, only the driver that keeps the steering column in the nominal position in which vehicle development was performed will experience the intended vehicle steering performance (e.g., the nominal vehicle response and the nominal torque feedback).

As used herein, the terms "rotational velocity variation" and "velocity variation" are used interchangeably and refer to a varying velocity profile of a pinion angle with respect to a constant velocity profile of a steering wheel angle. For example, when a steering wheel is turned with a constant steering wheel velocity, corresponding road wheels may not rotate proportionately to the constant steering wheel velocity. For example, when the steering wheel is turned with the constant steering wheel velocity, a corresponding steering wheel angle rotates proportionately, however a corresponding pinion angle may rotate disproportionately to the steering wheel angle.

As used herein, the terms "steering wheel torque feedback variation" and "torque feedback variation" are used interchangeably and refer to a varying amount of torque feedback experienced by a driver at the steering wheel with respect to the steering column position and/or the steering wheel angle. For example, when a driver provides a constant torque to turn the steering wheel, the torque feedback experienced by the driver may not be proportionate to the provided constant torque across a range of steering wheel angles (e.g., from −500 degrees to +500 degrees) at a steering column position. In some examples, a velocity variation and/or a torque feedback variation occurs at either a nominal position of a steering column or an adjusted position from the nominal position of the steering column.

In some examples, the steering wheel and the road wheels are aligned (e.g., function uniformly) while the steering column is in the nominal position. For example, when the motor vehicle is traveling in a straight line (e.g., the road wheels are facing straight ahead), the steering wheel is also facing forward (e.g., in a center position) while the steering column is in the nominal position. Thus, the manufacturer of the motor vehicle accounts for the non-uniformity generated by the universal joints while the steering column is in the nominal position. However, if the driver adjusts the steering column and/or the steering wheel from the nominal position, the geometric effect of the change due to the universal joints offsets the magnitude and/or the phase relationship of the vehicle steering system. For example, the driver changing the position of the steering column and/or the steering wheel may create a situation in which the steering wheel is not necessarily in the center position, and instead appears to be rotated with respect to the driver of the vehicle when the road wheels are facing straight ahead.

As used herein, a difference (e.g., an angular difference) between (1) a center position of the steering wheel, and (2) an actual position of the steering wheel when the road wheels are facing straight ahead is referred to as a clear vision error or a clear vision error angle. For example, the driver believes the vehicle is traveling straight, but the steering wheel does not appear straight (e.g., does not appear to be in the center position). Thus, only the driver that keeps the steering column in the nominal position in which vehicle development was performed will experience an insignificant amount of clear vision error (e.g., the clear vision error angle is approximately zero).

Examples disclosed herein can facilitate correcting for non-uniformities (e.g., velocity variations, torque feedback variations, clear vision errors, etc.) in a vehicle steering system caused by the steering column in either the nominal position or caused by adjusting the steering column from the nominal position. Packaging flexibility of the vehicle steering system is currently constrained based on a need to minimize non-uniformity at the nominal position. Examples disclosed herein can lift restrictions placed on vehicle steering system packaging by compensating for the non-uniformities at either the nominal position or at an adjusted position different from the nominal position.

Disclosed examples include a non-uniformity manager to identify non-uniformities and correct (e.g., dynamically correct, statically correct, etc.) for the non-uniformities (e.g., the velocity variations, the torque feedback variations, etc.) in a vehicle steering system. For example, the non-uniformity manager may dynamically correct for the non-uniformities by determining a correction factor (e.g., an angular offset, a torque offset, etc.) based on a steering column position for each change in steering wheel angle. In another example, the non-uniformity manager may statically correct for the non-uniformities by determining a correction factor (e.g., a clear vision angular offset) based on a steering column position for any steering wheel angle at the steering column position.

In some disclosed examples, the non-uniformity manager identifies a non-uniformity based on an angular difference between (1) a steering wheel angle associated with the steering wheel, and (2) a pinion angle associated with a pinion coupled to the steering rack of the vehicle steering system. In some examples, the steering wheel angle is obtained from a steering wheel angle sensor positioned above the highest (top) universal joint that connects to the steering wheel shaft. In some instances, the pinion angle is obtained from a pinion angle sensor positioned relative to the lowest (bottom) universal joint in the vehicle steering system. The example non-uniformity manager may compare the steering wheel angle to the pinion angle to determine an angular difference or a u-joint phasing. The example non-uniformity manager may then map the u-joint phasing to a steering column position and/or a steering wheel angle in a look-up table. In some examples, the non-uniformity manager maintains a pre-populated table of u-joint phasing-to-steering column position mappings (e.g., a u-joint phasing look-up table, a velocity variation look-up table, etc.) based on, for example, the make and model of the motor vehicle, the geometry of the vehicle steering system (e.g., the number of universal joints), etc.

In some disclosed examples, an operator (e.g., a technician) determines a steering column type such as, for example, an electrically adjustable type (e.g., a steering column that includes one or more actuators and/or position sensors), a manually adjustable type (e.g., a steering column that includes a mechanical latching system), etc. of a steering column for a vehicle steering system. The operator may enter an input corresponding to the steering column type into the vehicle steering system. For example, the operator may enter an input to the non-uniformity manager indicating that the steering column is an electrically adjustable type. In some instances, the operator determines a steering column position based on a read-out from an output device (e.g., a display) communicatively coupled to the vehicle steering system.

Additionally or alternatively, the example non-uniformity manager may determine a steering column type for a steering column of a vehicle steering system. The example non-uniformity manager may determine the steering column type based on whether the steering column includes one or more linear motors or position sensors. For example, the non-uniformity manager may determine that a steering column is an electrically adjustable type based on the vehicle steering system including one or more linear motors and/or position sensors.

In some disclosed examples, the non-uniformity manager generates a pre-defined look-up table formulated based on a calibration process. For example, the non-uniformity manager may generate a look-up table (e.g., a velocity variation look-up table, a torque feedback variation look-up table, etc.) based on a steering column position. An operator (e.g., a technician) may select a starting (e.g., an initial) rake position and a starting reach position of a steering column. The operator may determine or measure a clear vision error at the starting rake position and the starting reach position. The operator may store (enter) the clear vision error in the example non-uniformity manager. For example, the operator may map the clear vision error to the starting rake position and the starting reach position. The example non-uniformity manager may determine a rotational velocity of a steering wheel with respect to corresponding road wheels based on a measurement of a steering wheel angle sensor, a pinion angle sensor, etc. The example non-uniformity manager may determine a steering wheel torque feedback based on a measurement of a torque sensor.

The operator may turn the steering wheel with a constant steering wheel velocity and a constant steering wheel torque for a desired range of the steering wheel (e.g., from −500 degrees to +500 degrees). The example non-uniformity manager may determine the rotational velocity and the torque feedback for each angle of the desired range. The example non-uniformity manager may map the rotational velocity and the steering wheel torque feedback to the selected steering column position and the steering wheel angle for the desired range in a look-up table. The example non-uniformity manager may generate a profile (e.g., a non-uniformity profile) for the steering column position based on the rotational velocity and the torque feedback varying as a function of steering wheel angle at the steering column position. The example non-uniformity manager may store the profile in the look-up table.

The example non-uniformity manager may repeat (e.g., iteratively repeat) the above described process for a plurality of steering column positions chosen by the operator and/or the non-uniformity manager. The example non-uniformity manager may repeat the above described process to generate a complete set of pre-defined profiles and store the complete set of pre-defined profiles in the look-up table. The operator may determine and store a clear vision error for each steering column position. For example, the operator may map a clear vision error to each steering column position. Alternatively, the example non-uniformity manager may automatically select a starting rake position and a starting reach position.

In some disclosed examples, the non-uniformity manager determines and applies an angular correction factor (e.g., an active steering system angular offset, a clear vision angular offset, etc.) and a torque correction factor (e.g., a torque offset) based on a look-up table. For example, the non-uniformity manager may identify a non-uniformity profile based on measured angles (e.g., steering wheel angles, pinion angles, etc.). The identified non-uniformity profile, the measured angles, etc. may correspond to the steering column at an adjusted position from the nominal position.

The example non-uniformity manager may identify a reference profile based on reference angles. The reference profile, the reference angles, etc. may correspond to the steering column in the nominal position. The example non-uniformity manager may calculate a difference between the identified non-uniformity profile and the reference profile at the current steering wheel angle. The example non-uniformity manager may calculate the angular correction factor and the torque correction factor based on the difference. The angular correction factor and the torque correction factor may be used to give the driver utilizing a non-nominal steering wheel position and/or a non-nominal steering column position a nominal steering ratio and nominal torque feedback behavior. For example, the non-uniformity manager may transmit the angular correction factor to the active steering system and the torque correction factor to an electric power assist steering (EPAS) system to provide the driver with the nominal steering experience. Alternatively, the non-uniformity manager may determine and apply the angular correction factor and the torque correction factor to improve the overall steering performance of the vehicle steering system when the steering column is in the nominal position.

FIG. 1 is a block diagram of an example vehicle steering system 100 within which the teachings of this disclosure may be implemented. In the illustrated example of FIG. 1, the vehicle steering system 100 includes an example steering wheel 102, an example steering column 104, a first example steering shaft 106, a second example steering shaft 108, and an example front steering rack 110. Although the disclosed techniques are described using a two-wheel vehicle steering system 100 of a four-wheeled motor vehicle, the disclosed techniques may be implemented with motor vehicles having any number of wheels (e.g., road wheels). Furthermore, while the disclosed techniques are described using an example front active steering system, the disclosed techniques may additionally or alternatively be implemented using a rear active steering system.

In the illustrated example of FIG. 1, the steering wheel 102 is coupled to a first end of the steering column 104. A second end of the steering column 104 is coupled to a first end of the first steering shaft 106 via a first universal joint (also referred to herein as a u-joint) 112. A second end of the first steering shaft 106 is coupled to a first end of the second steering shaft 108 via a second universal joint 114. A second end of the second steering shaft 108 is coupled to the front steering rack 110 via, for example, a pinion (e.g., a pinion gear). The front steering rack 110 is an example implementation of a rack-and-pinion steering system and encompasses a plurality of components included in the rack-and-pinion steering system such as, for example, a pinion gear, a gear rack, one or more tie rods, a steering arm, etc. Although the example vehicle steering system 100 of FIG. 1 includes two example universal joints 112, 114 and two example steering shafts 106, 108 to connect the steering column 104 to the front steering rack 110, the vehicle steering system 100 may include any number of universal joints and/or steering shafts between the steering column 104 and the front steering rack 110.

To facilitate adjusting the position of the steering wheel 102, the example vehicle steering system 100 includes an example column position adjusting system 120. The column position adjusting system 120 of FIG. 1 is included in the steering column 104. In the illustrated example of FIG. 1, the column position adjusting system 120 enables a driver to adjust the rake (e.g., up-or-down) position and/or the reach (e.g., toward-or-away) position of the steering wheel 102. For example, the driver may manually release a locking mechanism included in the column position adjusting system 120 to manually adjust the steering wheel 102 and/or the steering column 104 into a steering column position preferred by the driver (e.g., a preferred rake position and/or a preferred reach position). Although the disclosed column position adjusting system 120 included in the vehicle steering system 100 of FIG. 1 is a manually adjustable column position adjusting system, other techniques, such as a motorized adjustment system and/or an electrical adjustment system, may additionally or alternatively be used. For example, a driver may use an electrical switch (or switches) to control actuation of one or more motors (e.g., linear actuator motors) to position the steering wheel 102 and/or the steering column 104 into a preferred steering column position.

The example vehicle steering system 100 of FIG. 1 includes an electric power assist steering (EPAS) system 130 to adjust torque applied to and/or by the example vehicle steering system 100. The example EPAS system 130 is connected to the front steering rack 110 to apply (e.g., supplement) or subtract (e.g., remove) torque from the vehicle steering system 100 as necessary. For example, the EPAS system 130 may adjust the amount of torque applied by the driver to the steering wheel 102 and/or the steering column 104. In some examples, the EPAS system 130 adjusts the torque feedback experienced by the driver. For example, the EPAS system 130 may apply torque to and/or subtract torque from the vehicle steering system 100 using, for example, one or more controlled electric motors. As used herein, the term torque (also known as moment or moment of force) refers a turning force or a rotational force (e.g., a force that causes an object to rotate). In the illustrated example, the EPAS system 130 includes a torque sensor 132 to measure a torque applied by the vehicle steering system 100 and/or a torque feedback from the EPAS System 130.

The example vehicle steering system 100 of FIG. 1 also includes an active steering system 140 to continuously adjust the relationship between a steering input at the steering wheel 102 (e.g., when the driver rotates (or turns) the steering wheel 102) and the angle of the road wheels (e.g., the angle of the road wheels with respect to a longitudinal axis of the vehicle) via an active steering system actuator 142. In the illustrated example, the active steering system actuator 142 is mounted in the steering wheel. For example, the active steering system 140 may adjust the degree to which the road wheels turn in response to rotation of the steering wheel 102 by applying an overlay angle (e.g., an actuator motor overlay angle) to the active steering system actuator 142.

In some instances, the active steering system 140 determines the actuator motor angle of the active steering system actuator 142. In the illustrated example, the active steering system 140, such as an Active Front Steering (AFS) system, is connected to the steering wheel 102. As used herein, the relationship between the steering input (e.g., the angle of rotation at the steering wheel) and the steering output (e.g., the angle of rotation at the road wheels) is referred to as a steering response or a steering ratio (SR). In some examples, the active steering system 140 adjusts the steering ratio based on, for example, a steering rack ratio, suspension steer geometry, intermediate shaft, and column design (e.g., number of sliders, number, and location and/or orientation of universal joints), etc. In some instances, the active steering system 140 adjusts the steering ratio by applying an overlay angle (e.g., a correction angle). For example, the active steering system 140 may adjust the steering ratio by applying an overlay angle by adjusting the actuator motor angle of the active steering system actuator 142.

The example vehicle steering system 100 includes an example non-uniformity manager 150 to facilitate compensating or correcting for velocity variations and/or torque feedback variations in the vehicle steering system 100 due to the steering column 104 in a nominal position or a driver adjusting the position of the steering wheel 102 and/or the steering column 104 from the nominal position. In the illustrated example of FIG. 1, the non-uniformity manager 150 is included in the active steering system 140. Additionally or alternatively, the example non-uniformity manager 150 may be located elsewhere in the vehicle such as, for example, an engine control unit.

In some examples, the non-uniformity manager 150 of FIG. 1 determines a correction factor for a velocity variation and/or a torque feedback variation in the vehicle steering system 100 based on determining a steering column position of the steering column 104. In some examples, the non-uniformity manager 150 identifies the steering column position based on identifying a type of the steering column 104. For example, an operator (e.g., a technician) and/or the non-uniformity manager 150 may determine a type of the steering column 104 such as, for example, an electrically adjustable type, a manually adjustable type, etc.

In some examples, the non-uniformity manager 150 determines that a steering column is an electrically adjustable type via the column position adjusting system 120. For example, the column position adjusting system 120 may determine that the column position adjusting system 120 includes one or more actuators (e.g., a rake linear motor, a reach linear motor, etc.), one or more position sensors (e.g., a rake position sensor, a reach position sensor, etc.), etc. The example column position adjusting system 120 may transmit information to the example non-uniformity manager 150 indicating that a steering column (e.g., the steering column 104) is an electrically adjustable type. Alternatively, the example non-uniformity manager 150 may determine that the steering column is a manually adjustable type based on not receiving information from the column position adjusting system 120.

In the illustrated example of FIG. 1, the steering column 104 is a manually adjustable steering column type. The example non-uniformity manager 150 may determine the position of the steering column 104 based on identifying a non-uniformity. For example, the non-uniformity manager 150 may identify a velocity variation based on a steering wheel angle associated with the steering wheel 102 and a pinion angle associated with a pinion coupled to the front steering rack 110 of the vehicle steering system 100. To that end, the vehicle steering system 100 includes a steering wheel angle sensor 152 and a pinion angle sensor 154. The steering wheel angle sensor 152 is coupled to the steering wheel 102 and the steering column 104, and measures a steering wheel angle ($\theta_{sw}$) associated with the steering wheel 102. The example pinion angle sensor 154 is coupled to the second example steering shaft 108 and measures a pinion angle ($\theta_p$) associated with the second steering shaft 108.

In some instances, the non-uniformity manager 150 of FIG. 1 determines a steering column position for a manually adjustable steering column type based on identifying a non-uniformity profile of the vehicle steering system 100 using one or more sensor measurements. For example, the non-uniformity manager 150 may create a map or a profile of angular differences (e.g., delta angles) between the obtained steering wheel angle and the obtained pinion angle as a function of steering wheel angle. In some examples, the non-uniformity manager 150 calculates a non-uniformity angle by calculating a difference between a delta angle (e.g., a difference between a steering wheel angle and a pinion angle) and a compliance angle. The example non-uniformity manager 150 may calculate the compliance angle based on a stiffness of the steering column, a stiffness of the one or more u-joints, a torsion bar torque measured by the torque sensor 132, etc. The example non-uniformity manager 150 may obtain the stiffness of the steering column, the stiffness of the one or more u-joints, etc. from an engine control unit, a look-up table, etc.

In some instances, the non-uniformity manager 150 determines a non-uniformity angle by offsetting a delta angle with a compliance angle. The example non-uniformity manager 150 may determine the non-uniformity angle for a desired range (e.g., a full range) of steering wheel angles at the steering column position. The example non-uniformity manager 150 may map the non-uniformity angles to a pre-defined non-uniformity profile in a look-up table. The example non-uniformity manager may map the pre-defined non-uniformity profile to a steering column position. For example, the non-uniformity manager 150 may determine a rake position and a reach position of the steering column 104 based on identifying the pre-defined non-uniformity profile. Alternatively, the example non-uniformity manager 150 may determine that the pre-defined non-uniformity profile corresponds to the steering column 104 in the nominal position.

In some examples, the non-uniformity manager 150 determines a correction factor (e.g., an angular offset (e.g., an overlay angle), a torque offset, etc.) based on the determined steering column position. For example, the non-uniformity manager 150 may map the determined steering column position to a correction factor in a look-up table. The example non-uniformity manager 150 may instruct the active steering system 140 to apply an overlay angle to the active steering system actuator 142. In some instances, the non-uniformity manager instructs the EPAS system 130 to apply a torque offset to a current torque feedback to provide the driver an adjusted torque feedback corresponding to the steering column in the nominal position.

In some examples, the non-uniformity manager 150 calculates a steering column position based on an identified u-joint phasing utilizing a model. For example, during vehicle production and/or engineering design, engineers may develop a mathematical model that may be used to calculate a steering column position based on the identified u-joint phasing. For example, when the u-joint angles and the relative movement of the u-joint angles as a function of steering column position and/or steering wheel angle are known, the non-uniformity manager 150 may determine a velocity variation and/or a torque feedback variation by using one or more mathematic equations (e.g., a sinusoidal function). For example, an output of the sinusoidal function may be mapped to a velocity variation, where the velocity variation is mapped to a steering column position.

In some examples, the non-uniformity manager 150 determines that the calculated non-uniformity angles are in between pre-defined non-uniformity profiles in a look-up table. For example, the non-uniformity manager 150 may determine that the calculated non-uniformity angles correspond to portions of two pre-defined non-uniformity profiles (e.g., a matching non-uniformity profile is in between two pre-defined non-uniformity profiles). In response to the example non-uniformity manager 150 determining that the calculated non-uniformity angles are in between two or more pre-defined non-uniformity profiles, the non-uniformity manager 150 may implement an optimization method. For example, the non-uniformity manager 150 may determine (1) a first difference between a first pre-defined profile and the calculated non-uniformity angles, and (2) a second difference between a second pre-defined profile and the calculated non-uniformity angles. The example non-uniformity manager 150 may use one or more correction factors mapped to the pre-defined non-uniformity profile where a difference is smallest. For example, the non-uniformity manager 150 may utilize a correction factor mapped to the first pre-defined profile because the first difference is less than the second difference.

In some examples, the non-uniformity manager 150 determines a correction factor based on two or more pre-defined profiles. For example, the non-uniformity manager 150 may determine the first and the second differences as described above. The example non-uniformity manager 150 may determine one or more weight factors based on the first and the second differences. For example, the non-uniformity manager 150 may determine the first difference to be 0.5 degrees and the second difference to be 1.5 degrees, where the non-uniformity manager 150 determines a sum of the first and the second differences to be 2.0 degrees. The example non-uniformity manager 150 may determine the one or more weight factors based on a ratio of the first and the second differences. For example, the non-uniformity manager 150 may determine a first weight factor to be 0.75 (e.g., 1−(0.5÷(0.5+1.5))=0.75) and a second weight factor to be 0.25 (e.g., 1−(1.5÷(0.5+1.5))=0.25).

In some examples, the non-uniformity manager 150 determines a correction factor based on the one or more weight factors. For example, the non-uniformity manager 150 may determine (1) a first correction factor based on utilizing 75% of the first pre-defined non-uniformity profile, and (2) a second correction factor based on utilizing 25% of the second pre-defined non-uniformity profile. The example non-uniformity manager 150 may apply a third correction factor to the vehicle steering system 100, where the third correction factor is based on the first and the second correction factors. For example, the non-uniformity manager 150 may calculate the third correction factor by determining a sum of the first and the second correction factors.

In some examples, the non-uniformity manager 150 generates one or more pre-defined profiles in a look-up table to correct a non-uniformity (e.g., a velocity variation, a torque feedback variation, a clear vision error, etc.) based on a calibration process. For example, an operator (e.g., a technician) may enter an input (e.g., set a value for a steering column type flag in computer-readable and/or machine-readable instructions) in the non-uniformity manager 150 indicating whether the steering column 104 is an electrically adjustable or a manually adjustable steering column type. The operator may select a starting (e.g., an initial) rake position of the steering column 104. The operator may manually move the steering column 104 to the starting rake position. In some examples, the starting rake position is the nominal rake position. The operator may measure the starting rake position based on a read-out from an output device (e.g., a display) communicatively coupled to the vehicle steering system 100. Additionally or alternatively, the example non-uniformity manager 150 may determine and/or measure the starting rake position of the steering column 104.

The operator may select a starting reach position of the steering column 104. The operator may then move the steering column 104 to the starting reach position. In some instances, the starting reach position is the nominal reach position. The operator may measure the starting reach position based on a read-out from the output device. Additionally or alternatively, the example non-uniformity manager 150 may determine and/or measure the starting reach position of the steering column 104. Alternatively, the operator and/or the example non-uniformity manager 150 may first select the starting reach position and then select the starting rake position.

When the operator moves the steering column 104 to the starting rake position and the starting reach position, the example non-uniformity manager 150 may obtain a steering wheel angle from the steering wheel angle sensor 152 and a pinion angle from the pinion angle sensor 154. Additionally, the operator may determine or measure a clear vision error at the starting rake position and the starting reach position. The operator may store (enter) the clear vision error in the example non-uniformity manager. For example, the operator may map the clear vision error to the starting rake position and the starting reach position. The example non-uniformity manager 150 may calculate a delta angle based on a difference between the steering wheel angle and the pinion angle. The example non-uniformity manager 150 may calculate a compliance angle based on one or more factors such as, for example, a stiffness of the steering column 104. The example non-uniformity manager 150 may calculate a non-uniformity angle based on a difference between the delta angle and the compliance angle. The operator may apply a constant steering wheel velocity and a constant steering wheel torque over a full range of a rotation of the steering wheel 102 (e.g., from a steering wheel angle of −500 degrees to +500 degrees). The example non-uniformity manager 150 may obtain a rotational velocity measurement and a torque feedback measurement (e.g., a steering wheel torque feedback measurement) at each steering wheel angle. The example non-uniformity manager 150 may generate a non-uniformity profile as a function of steering wheel angle for the starting steering column position (e.g., the nominal steering column position). The example non-uniformity manager 150 may store the non-uniformity profile in a look-up table.

The operator may adjust the steering column 104 to different combinations of rake positions and reach positions. The example non-uniformity manager 150 may generate a non-uniformity profile for each of the selected steering column positions. The example non-uniformity manager 150 may store the non-uniformity profiles in a look-up table. The operator may determine and store a clear vision error for the different steering column positions. For example, the operator may map a clear vision error to each difference steering column position. The example non-uniformity manager 150 may calculate a correction factor (e.g., an angular offset (e.g., an incremental actuator motor angle), a torque offset (e.g., an EPAS torque overlay), etc.) as a function of steering wheel angle to give the driver utilizing a non-nominal steering wheel position and/or a non-nominal steering column position a nominal steering ratio and nominal torque feedback behavior. Alternatively, the example non-uniformity manager 150 may calculate a correction factor as a function of steering wheel angle to improve the vehicle steering experience for the driver utilizing the nominal steering wheel position and/or the nominal steering column position.

In some examples, the non-uniformity manager 150 compensates (e.g., dynamically compensates) for a velocity variation and a torque feedback variation based on a steering column position and a steering wheel angle. For example, the non-uniformity manager 150 may determine a first steering column position (e.g., a nominal position, an adjusted position from the nominal position, etc.) of the steering column 104 and a first steering wheel angle of the steering wheel 102. The example non-uniformity manager 150 may identify a non-uniformity profile based on the first steering column position. The example non-uniformity manager 150 may determine one or more correction factors based on the non-uniformity profile and the first steering wheel angle. For example, the non-uniformity manager 150 may determine a first overlay angle (e.g., a correction angle) and a first torque offset based on mapping the first steering column position and the first steering wheel angle to a look-up table.

In some examples, the first overlay angle is relative to the steering wheel angle and the pinion angle to correct for the velocity variation due to the u-joint phasing. In some examples, the non-uniformity manager instructs the active steering system 140 to apply the first overlay angle to a current active steering system overlay angle via the active steering system actuator 142. In some instances, the non-uniformity manager 150 instructs the EPAS system 130 to apply the first torque offset to a current torque feedback. The example non-uniformity manager 150 may apply the first overlay angle and the first torque offset to give the driver utilizing the first steering wheel position at the first steering column position a nominal steering ratio and nominal torque feedback behavior. Alternatively, if the steering column position is the nominal position, then the example non-uniformity manager 150 may determine and apply one or more correction factors to improve the overall steering experience for the driver at the nominal position.

In some examples, when a driver adjusts the steering wheel 102 from the first steering wheel angle to a second steering wheel angle at the first steering column position, the non-uniformity manager 150 determines a second overlay angle and a second torque offset. The example non-uniformity manager 150 may apply the second overlay angle to the active steering system 140 via the active steering system actuator 142, where the second overlay angle may be different than the first overlay angle. The example non-uniformity manager 150 may apply the second torque offset to the EPAS system 130, where the second torque offset may be different than the first torque offset. The example non-uniformity manager 150 may apply the second overlay angle and the second torque offset to give the driver utilizing the second steering wheel position at the first steering column position the nominal steering ratio and the nominal torque feedback behavior. Alternatively, if the steering column position is the nominal position, then the example non-uniformity manager 150 may determine and apply one or more correction factors to improve the overall steering experience for the driver at the nominal position.

In some examples, when the driver adjusts the steering column 104 from the first steering column position to a second steering column position, the non-uniformity manager 150 determines a third overlay angle and a third torque offset. If the steering column 104 is an electrically adjustable type, then the example non-uniformity manager 150 maps the second steering column position to the third overlay angle and the third torque offset in a look-up table. If the steering column 104 is a manually adjustable type, then the example non-uniformity manager 150 determines a non-uniformity angle for a desired range of the steering wheel 102 to generate a non-uniformity profile. The example non-uniformity manager 150 may map the non-uniformity profile to a pre-defined non-uniformity profile in a look-up table. The example non-uniformity manager 150 may determine the third overlay angle and the third torque offset corresponding to the pre-defined non-uniformity profile.

In some examples, the non-uniformity manager 150 compensates (e.g., statically compensates) for a clear vision error based on a steering column position. For example, the non-uniformity manager 150 may determine a first steering column position (e.g., a nominal position, an adjusted position from the nominal position, etc.) of the steering column 104 via the column position adjusting system 120, identifying a non-uniformity profile, etc. The example non-uniformity manager 150 may determine a first clear vision correction angle based on the first steering column position. In some instances, the non-uniformity manager 150 determines the first clear vision correction angle by mapping the first steering column position to the first clear vision correction angle in a look-up table. The example non-uniformity manager 150 may apply the first clear vision correction angle for a full range of steering wheel angles of the steering wheel 102. For example, the non-uniformity manager 150 may apply the first clear vision correction angle for a steering wheel angle ranging from −500 degrees to +500 degrees while the steering column 104 is in the first steering column position.

In some examples, when a driver adjusts the steering column 104 from the first steering column position to a second steering column position, the non-uniformity manager 150 determines a second clear vision correction angle, where the second clear vision correction angle may be different than the first clear vision correction angle. The example non-uniformity manager 150 may determine the second clear vision correction angle by mapping the second steering column position to the second clear vision correction angle in a look-up table. The example non-uniformity manager 150 may apply the second clear vision correction angle for the full range of steering wheel angles of the steering wheel 102 while the steering column 104 is in the second steering column position.

In some examples, the non-uniformity manager 150 calculates an angular offset to provide to the active steering system 140 and a torque offset to provide to the EPAS system 130. For example, if the non-uniformity manager 150 identifies a non-uniformity profile that corresponds to a large increase in steering ratio, then the driver will experience a correspondingly large variation in vehicle response and torque feedback relative to when the steering column is in the nominal position. Once the example non-uniformity manager 150 determines the non-uniformity profile and the corresponding current steering column position, the non-uniformity manager 150 may provide the active steering system 140 an angular offset to vary the overlay angle provided by the active steering system 140. The example non-uniformity manager 150 may additionally or alternatively request the EPAS system 130 to change the torque offset resulting in a change of the amount of torque assistance provided by the EPAS system 130, thereby providing the driver with a more uniform torque feedback to turn the steering wheel 102. Example techniques for compensating for steering response and torque feedback based on a steering column position are disclosed in U.S. patent application Ser. No. 14/948,806, filed on Nov. 23, 2015, entitled "Methods and Systems for Controlling Steering Response and Steering Torque Feedback Based on Steering Position," which is hereby incorporated herein by reference in its entirety.

Although disclosed examples are described herein in connection with the non-uniformity manager 150 being included in the active steering system 140, the non-uniformity manager 150 may be implemented separate from the active steering system 140. For example, the non-uniformity manager 150 may be implemented by the EPAS system 130. Furthermore, the EPAS system 130, the active steering system 140 and/or the non-uniformity manager 150 may be implemented by a central controller (e.g., an engine control unit).

While an example manner of implementing the vehicle steering system 100 of FIG. 1 is illustrated in FIG. 1, one or more of the elements, processes and/or devices illustrated in FIG. 1 may be combined, divided, re-arranged, omitted, eliminated, and/or implemented in any other way. Further, the example column position adjusting system 120, the example EPAS system 130, the example torque sensor 132, the example active steering system 140, the active steering system actuator 142, the example non-uniformity manager 150, the example steering wheel angle sensor 152, the example pinion angle sensor 154, and/or, more generally, the example vehicle steering system 100 of FIG. 1 may be implemented by hardware, software, firmware and/or any combination of hardware, software and/or firmware. Thus, for example, any of the example column position adjusting system 120, the example EPAS system 130, the example torque sensor 132, the example active steering system 140, the active steering system actuator 142, the example non-uniformity manager 150, the example steering wheel angle sensor 152, the example pinion angle sensor 154, and/or, more generally, the example vehicle steering system 100 of FIG. 1 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example column position adjusting system 120, the example EPAS system 130, the example torque sensor 132, the example active steering system 140, the active steering system actuator 142, the example non-uniformity manager 150, the example steering wheel angle sensor 152, the example pinion angle sensor 154 and/or, more generally, the example vehicle steering system 100 of FIG. 1 is/are hereby expressly defined to include a tangible computer-readable storage device or storage disk such as a memory, a digital versatile disk (DVD), a compact disk (CD), a Blu-ray disk, etc. storing the software and/or firmware. Further still, the example vehicle steering system 100 of FIG. 1 may include one or more elements, processes and/or devices in addition to, or instead of, those illustrated in FIG. 1, and/or may include more than one of any or all of the illustrated elements, processes, and devices.

Figure 2:
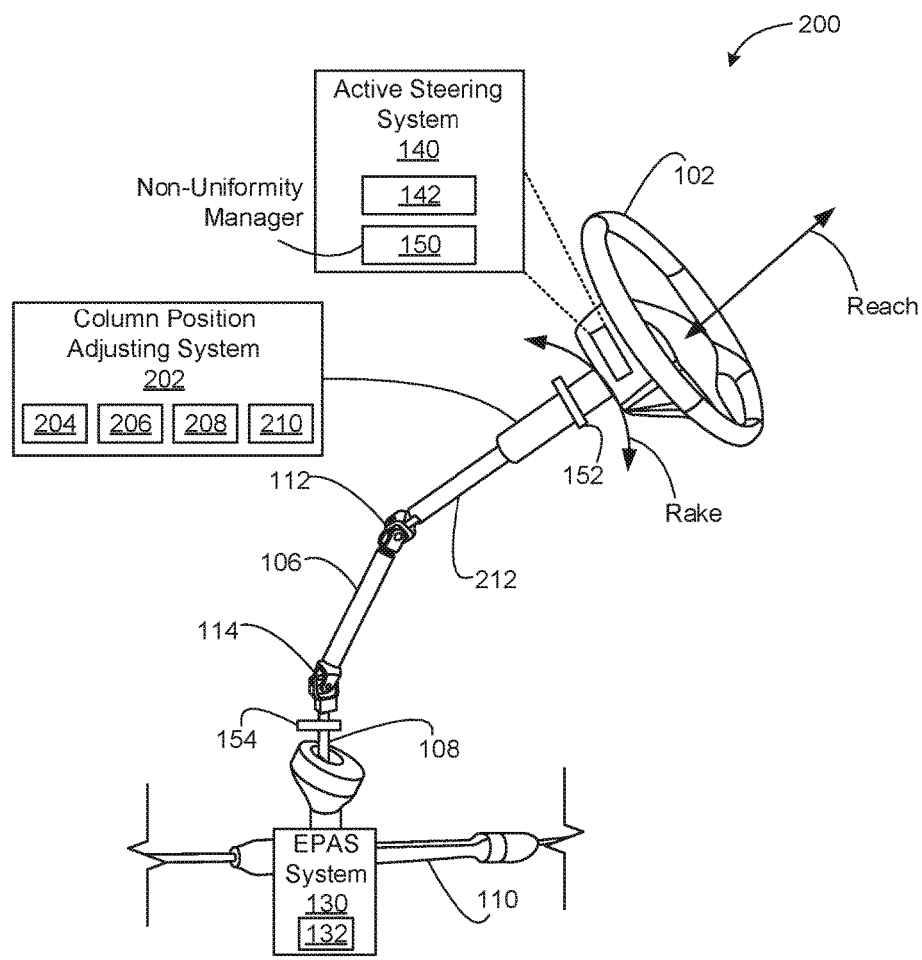
FIG. 2 is a block diagram of another example vehicle steering system within which the teachings of this disclosure may be implemented.

FIG. 2 is a block diagram of an example vehicle steering system 200 within which the teachings of this disclosure may be implemented. In the illustrated example of FIG. 2, the vehicle steering system 200 includes the example steering wheel 102, the first example steering shaft 106, the second example steering shaft 108, the example front steering rack 110, the first universal joint 112, and the second universal joint 114 of FIG. 1. In the illustrated example, the vehicle steering system 200 further includes the EPAS system 130, the torque sensor 132, the active steering system 140, the active steering system actuator 142, the non-uniformity manager 150, steering wheel angle sensor 152, and the pinion angle sensor 154 of FIG. 1.

To facilitate adjusting the position of the steering wheel 102, the example vehicle steering system 100 includes an example column position adjusting system 202, an example rake linear motor 204, an example reach linear motor 206, an example rake position sensor 208, and an example reach position sensor 210. The example column position adjusting system 202 of FIG. 2 is included in a steering column 212. In the illustrated example of FIG. 2, the steering column 212 is electrically adjustable. The column position adjusting system 202 enables a driver to adjust the steering column 212 to a steering column position preferred by the driver (e.g., a preferred rake position and/or a preferred reach position).

In the illustrated example of FIG. 2, the column position adjusting system 202 includes the rake linear motor 204 and the reach linear motor 206 to enable a driver to adjust the rake (e.g., up-or-down) position and/or the reach (e.g., toward-or-away) position of the steering wheel 102. For example, the driver may use an electrical switch (or switches) to control actuation of the rake linear motor 204 and/or the reach linear motor 206 to position the steering wheel 102 and/or the steering column 104 into a preferred position. The example column position adjusting system 202 of FIG. 2 includes the rake position sensor 208 to determine a position of the rake linear motor 204. In the illustrated example, the column position adjusting system 202 includes the reach position sensor 210 to determine a position of the reach linear motor 206.

Although the disclosed techniques are described utilizing singular instances of the rake linear motor 204, the reach linear motor 206, the rake position sensor 208, and the reach position sensor 210, the disclosed techniques may be implemented with two or more instances of the rake linear motor 204, the reach linear motor 206, the rake position sensor 208, and/or the reach position sensor 210. Although the disclosed techniques are described using a two-wheel vehicle steering system 200 of a four-wheeled motor vehicle, the disclosed techniques may be implemented with motor vehicles having any number of wheels (e.g., road wheels). Furthermore, while the disclosed techniques are described using an example front active steering system, the disclosed techniques may additionally or alternatively be implemented using a rear active steering system.

In some examples, the non-uniformity manager 150 calculates an angular offset (e.g., an active steering system overlay angle) to provide to the active steering system 140 to correct for clear vision errors in the vehicle steering system 200. For example, the non-uniformity manager 150 may identify a position of the steering column 212 and determine the angular clear vision offset based on the identified position of the steering column 212. The example non-uniformity manager 150 may identify the position of the steering column 212 by determining a type of the steering column 212 such as, for example, an electrically adjustable type, a manually adjustable type, etc. The column position adjusting system 202 may transmit information to the example non-uniformity manager 150 indicating that the steering column 212 is an electrically adjustable type.

In some instances, the non-uniformity manager 150 determines the position of the steering column 212 based on a position of the rake linear motor 204 and/or the reach linear motor 206 obtained from the rake position sensor 208 and/or the reach position sensor 210. In some examples, the non-uniformity manager 150 maps the identified steering column position to the angular clear vision offset using a look-up table, where the look-up table may be a 3-D table, or a separate data table (e.g., a steering column position-to-correction factor look-up table, etc.).

In some examples, the non-uniformity manager 150 of the vehicle steering system 200 generates one or more predefined profiles in a look-up table to correct a non-uniformity (e.g., a velocity variation, a torque feedback variation, a clear vision error, etc.) based on a calibration process. For example, an operator (e.g., a technician) may enter an input (e.g., set a value for a steering column type flag in computer-readable and/or machine-readable instructions) in the non-uniformity manager 150 indicating whether the steering column 212 is electrically adjustable. The operator may select a starting (e.g., an initial) rake position of the steering column 104. The operator may manually move the steering column 212 to the starting rake position. In some examples, the starting rake position is the nominal rake position. The operator may measure the starting rake position based on a read-out from an output device (e.g., a display) communicatively coupled to the vehicle steering system 200.

Alternatively, the example non-uniformity manager 150 may determine the starting rake position and adjust the steering column 212 to the starting rake position. For example, the non-uniformity manager 150 may transmit a command to the column position adjusting system 202 to move the steering column 212 to the starting rake position via the rake linear motor 204. For example, the column position adjusting system 202 may actuate the rake linear motor 204 to move the steering column 212 to the starting rake position based on a measurement from the rake position sensor 208. The column position adjusting system 202 may actuate the rake linear motor 204 until the column position adjusting system 202 obtains a measurement from the rake position sensor 208 indicating that the current rake position of the steering column 212 is the starting rake position.

The operator may select a starting reach position of the steering column 212. The operator may manually move the steering column 212 to the starting reach position. In some instances, the starting reach position is the nominal reach position. The operator may measure the starting reach position based on a read-out from the output device. Alternatively, the example non-uniformity manager 150 may determine the starting reach position. The example non-uniformity manager 150 may adjust the steering column 212 to the starting reach position via the reach linear motor 206 as described above in connection with adjusting the steering column 212 to the starting rake position.

When the operator and/or the example non-uniformity manager 150 moves the steering column 212 to the starting rake position and the starting reach position, the non-uniformity manager 150 may obtain a steering wheel angle from the steering wheel angle sensor 152 and a pinion angle from the pinion angle sensor 154. Additionally, the operator may determine or measure a clear vision error at the starting rake position and the starting reach position. The operator may store (enter) the clear vision error in the example non-uniformity manager 150. For example, the operator may map the clear vision error to the starting rake position and the starting reach position. The example non-uniformity manager 150 may calculate a delta angle based on a difference between the steering wheel angle and the pinion angle. The example non-uniformity manager 150 may calculate a compliance angle based on one or more factors such as, for example, a stiffness of the steering column 212. The example non-uniformity manager 150 may calculate a non-uniformity angle based on a difference between the delta angle and the compliance angle.

The operator may apply a constant steering wheel velocity and a constant steering wheel torque over a full range of the steering wheel 102 (e.g., from a steering wheel angle of −500 degrees to +500 degrees). The example non-uniformity manager 150 may obtain a rotational velocity measurement and a torque feedback measurement (e.g., a steering wheel torque feedback measurement) at each steering wheel angle. The example non-uniformity manager 150 may generate a non-uniformity profile as a function of steering wheel angle for the starting steering column position (e.g., the nominal steering column position). The example non-uniformity manager 150 may store the non-uniformity profile in a look-up table. Alternatively, the example non-uniformity manager 150 may turn the steering wheel 102 at the constant steering wheel velocity and the constant steering wheel torque over the full range of the steering wheel 102.

The operator may adjust the steering column 212 to different combinations of rake positions and reach positions. Alternatively, the example non-uniformity manager 150 may adjust the steering column 212 to different combinations of rake positions and reach positions via the rake linear motor 204, the reach linear motor 206, the rake position sensor 208, the reach position sensor 210, etc. The example non-uniformity manager 150 may generate a non-uniformity profile for each of the selected steering column positions. The example non-uniformity manager 150 may store the non-uniformity profiles in a look-up table. The operator and/or the example non-uniformity manager 150 may determine and store a clear vision error for the different steering column positions. For example, the operator and/or the non-uniformity manager 150 may map a clear vision error to each difference steering column position. The example non-uniformity manager 150 may calculate a correction factor (e.g., an angular offset (e.g., an incremental actuator motor angle), a torque offset (e.g., an EPAS torque overlay), etc.) as a function of steering wheel angle to give the driver utilizing a non-nominal steering wheel position and/or a non-nominal steering column position a nominal steering ratio and nominal torque feedback behavior. Alternatively, the example non-uniformity manager 150 may calculate a correction factor as a function of steering wheel angle to improve the vehicle steering experience for the driver utilizing the nominal steering wheel position and/or the nominal steering column position.

While an example manner of implementing the vehicle steering system 200 of FIG. 2 is illustrated in FIG. 2, one or more of the elements, processes and/or devices illustrated in FIG. 2 may be combined, divided, re-arranged, omitted, eliminated, and/or implemented in any other way. Further, the example EPAS system 130, the example torque sensor 132, the example active steering system 140, the active steering system actuator 142, the example non-uniformity manager 150, the example steering wheel angle sensor 152, the example pinion angle sensor 154, the example column position adjusting system 202, the example rake position sensor 208, the example reach position sensor 210, and/or, more generally, the example vehicle steering system 200 of FIG. 2 may be implemented by hardware, software, firmware and/or any combination of hardware, software and/or firmware. Thus, for example, any of the example EPAS system 130, the example torque sensor 132, the example active steering system 140, the active steering system actuator 142, the example non-uniformity manager 150, the example steering wheel angle sensor 152, the example pinion angle sensor 154, the example column position adjusting system 202, the example rake position sensor 208, the example reach position sensor 210, and/or, more generally, the example vehicle steering system 200 of FIG. 2 could be implemented by one or more analog or digital circuit(s), logic circuits, programmable processor(s), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example EPAS system 130, the example torque sensor 132, the example active steering system 140, the active steering system actuator 142, the example non-uniformity manager 150, the example steering wheel angle sensor 152, the example pinion angle sensor 154, the example column position adjusting system 202, the example rake position sensor 208, the example reach position sensor 210, and/or, more generally, the example vehicle steering system 200 of FIG. 2 is/are hereby expressly defined to include a tangible computer-readable storage device or storage disk such as a memory, a digital versatile disk (DVD), a compact disk (CD), a Blu-ray disk, etc. storing the software and/or firmware. Further still, the example vehicle steering system 200 of FIG. 2 may include one or more elements, processes and/or devices in addition to, or instead of, those illustrated in FIG. 2, and/or may include more than one of any or all of the illustrated elements, processes, and devices.

Figure 3A:
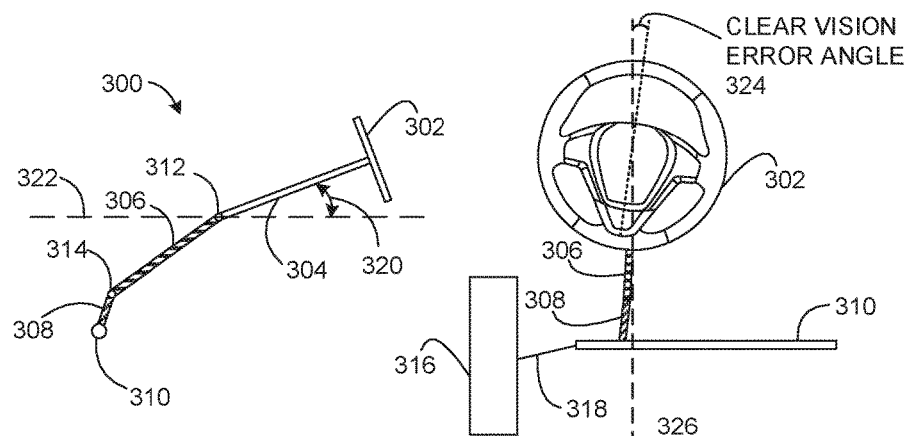
FIGS. 3A, 3B, and 3C are schematic illustrations of example clear vision errors.
Figure 3B:
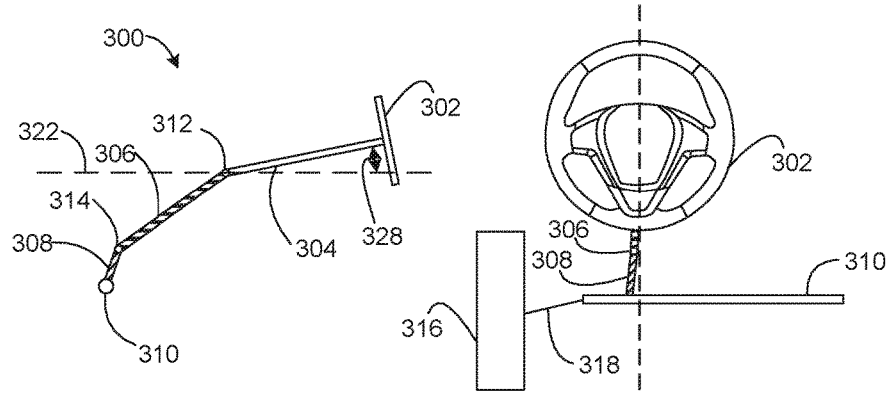
Figure 3C:
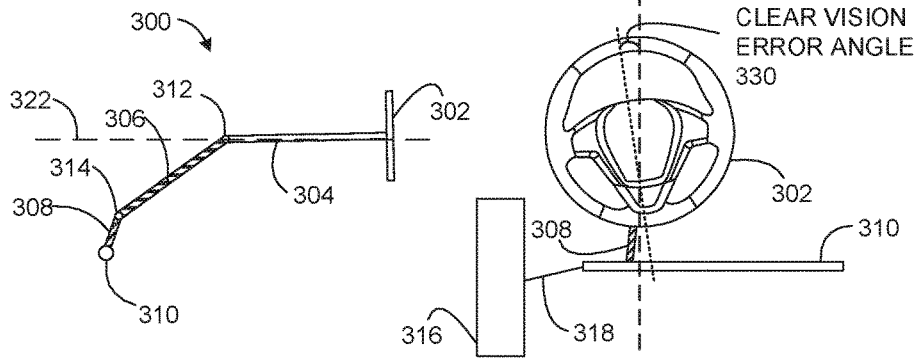

FIGS. 3A, 3B, and 3C are schematic illustrations of example clear vision errors. In the illustrated examples of FIGS. 3A, 3B, and 3C, a vehicle steering system 300 includes an example steering wheel 302, an example steering column 304, a first example steering shaft 306, a second example steering shaft 308, and an example front steering rack 310. The example vehicle steering system 300 is an example adaptation of the example vehicle steering system 100 of FIG. 1 or the example vehicle steering system 200 of FIG. 2. In the illustrated examples of FIGS. 3A, 3B, and 3C, the steering wheel 302 is coupled to a first end of the steering column 304. A second end of the steering column 304 is coupled to a first end of the first steering shaft 306 via a first universal joint 312. A second end of the first steering shaft 306 is coupled to a first end of the second steering shaft 308 via a second universal joint 314. A second end of the second steering shaft 308 is coupled to the front steering rack 310 via, for example, a pinion. The pinion is coupled to a road wheel 316 via a tie rod 318. Although the example vehicle steering system 300 of FIG. 3 includes two example universal joints 312, 314 and two example steering shafts 306, 308 to connect the steering column 304 to the front steering rack 310, the vehicle steering system 300 may include any number of universal joints and/or any number of steering shafts between the steering column 304 and the front steering rack 310.

In the illustrated example of FIG. 3A, the steering column 304 is at an angle 320 with respect to an axis 322, where the angle 320 represents a non-nominal position of the steering column 304. In the illustrated example of FIG. 3A, the non-nominal position of the steering column 304 induces a clear vision error angle 324 with respect to an axis 326. The example non-uniformity manager 150 of FIGS. 1 and/or 2 may correct for the clear vision error depicted in FIG. 3A. For example, the non-uniformity manager 150 may identify a steering column position and determine a clear vision correction factor (e.g., an angular offset, an active steering system overlay angle, etc.) based on the identified steering column position. The example non-uniformity manager 150 may identify the steering column position by determining the steering column type.

In the illustrated example of FIG. 3A, when the steering column 304 is an electrically adjustable steering column type, the non-uniformity manager 150 may determine the position of the steering column 304 based on a position of one or more actuators (e.g., the rake linear motor 204, the reach linear motor 206, etc.), a measurement of one or more sensors (e.g., the rake position sensor 208, the reach position sensor 210, etc.), etc. Alternatively, when the steering column 304 is a manually adjustable steering column type, the example non-uniformity manager 150 may determine the position of the manually adjustable steering column type based on identifying a non-uniformity profile. The example non-uniformity manager 150 may map the identified non-uniformity profile to the position of the steering column 304 (e.g., the rake position and/or the reach position of the steering column 304) in a look-up table. In response to the example non-uniformity manager 150 determining the position of the steering column 304, the non-uniformity manager 150 may map the position of the steering column 304 to the clear vision correction factor. For example, the non-uniformity manager 150 may provide the clear vision correction factor to the active steering system 140 to compensate for the clear vision error angle 324 of FIG. 3A.

In the illustrated example of FIG. 3B, the steering column 304 is at an angle 328 with respect to the axis 322, where the angle 328 is associated with a nominal position of the steering column 304. The angle 328 of FIG. 3B is less than the angle 320 of FIG. 3A. In the illustrated example of FIG. 3B, the nominal position of the steering column 304 does not induce a significant clear vision error (e.g., a clear vision error angle of approximately zero degrees). The presence of an insignificant clear vision error (e.g., the clear vision error is set to approximately zero, the clear vision error angle is approximately zero degrees, etc.) may represent a driver that keeps the steering column 304 in the nominal position in which vehicle development and/or vehicle manufacturing was performed.

In the illustrated example of FIG. 3C, the steering column 304 is at an angle of approximately zero degrees with respect to the axis 322. In the illustrated example, the position of the steering column 304 represents a non-nominal position of the steering column 304. In the illustrated example of FIG. 3C, the non-nominal position of the steering column 304 induces a clear vision error angle 330 with respect to the axis 326. The example non-uniformity manager 150 of FIGS. 1 and/or 2 may correct for the clear vision error depicted in FIG. 3C in a similar manner as described above in reference to FIG. 3A.

Figure 4:
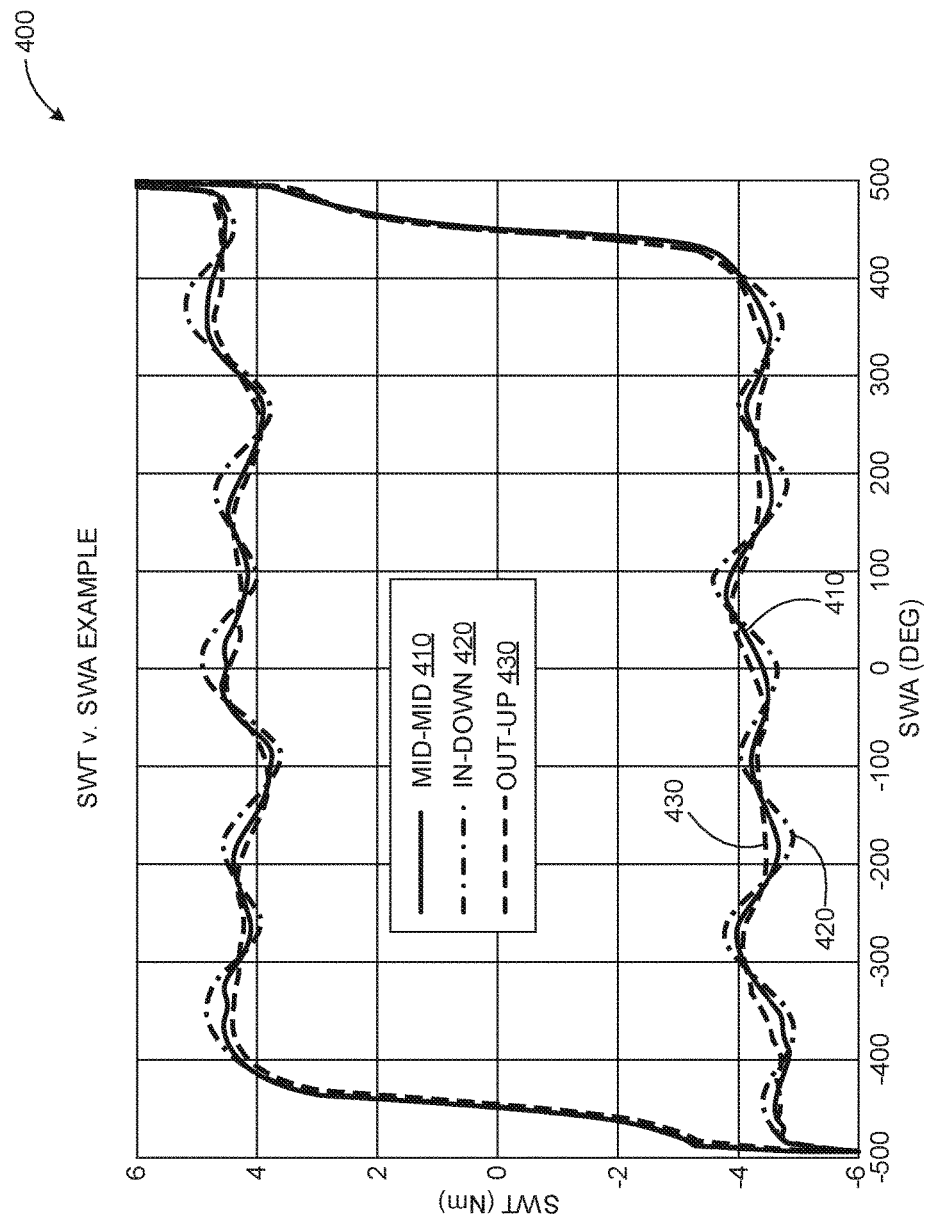
FIG. 4 is an example graph illustrating example variations in amplitude and phasing of Steering Wheel Torque (SWT) feedback over steering wheel angle for three different steering column positions in a vehicle steering system.

FIG. 4 is an example graph 400 illustrating example variations in amplitude and phasing of Steering Wheel Torque (SWT) measured in Newton-meters (Nm) as a function of Steering Wheel Angle (SWA) measured in degrees (DEG) due to variations in steering column position of vehicle steering system 100 of FIG. 1 or the vehicle steering system 200 of FIG. 2. In the illustrated example, the variations in amplitude and phasing of SWT are due to changes in rake position and/or reach position of the steering wheel 102 and/or the steering column 104 of FIG. 1 or the steering column 212 of FIG. 2.

The example graph 400 of FIG. 4 illustrates a SWA versus SWT plot 410 (depicted via a solid line) for a steering column having a nominal (e.g., mid-mid) position (e.g., the steering column is neither tilted nor telescopically adjusted from the factory default position). Example plots 420, 430 illustrate SWA versus SWT for alternate positions of the steering column (e.g., non-nominal steering column positions, etc.). For example, plot 420 illustrates SWA versus SWT when the steering column has been moved to an in-down position (e.g., the steering column 104, 212 has been moved to an "in" position relative to the nominal (mid) reach position and to a "down" position relative to the nominal (mid) rake position). Example plot 430 illustrates SWA versus SWT when the steering column has been moved to an out-up position (e.g., the steering column 104, 212 has been moved to an "out" position relative to the nominal (mid) reach position and to an "up" position relative to the nominal (mid) rake position).

As shown in the example graph 400 of FIG. 4, the SWT feedback experienced by the driver while the steering column 104, 212 is in an alternate (e.g., non-nominal) position (e.g., in-down, out-up, etc.) differs from the SWT feedback experienced by the driver while the steering column 104, 212 is in the nominal (e.g., mid-mid) position. The example non-uniformity manager 150 of FIGS. 1 and/or 2 compensates for the differing SWT feedback effects while the steering column 104, 212 is in a non-nominal position by identifying a correction factor variation over steering wheel angle (e.g., a torque offset) associated with the current steering column position (e.g., the current rake position and/or the current reach position) of the steering column 104, 212. In some examples, the non-uniformity manager 150 of FIGS. 1 and/or 2 instructs the EPAS system 130 of FIGS. 1 and/or 2 to compensate for (e.g., counteract) the differing SWT feedback effects while the steering column 104, 212 is in the non-nominal position so that the driver experiences (e.g., feels) the torque feedback effect associated with the steering column 104, 212 in the nominal position. In some instances, the non-uniformity manager 150 instructs the EPAS system 130 to compensate for SWT feedback effects while the steering column 104, 212 is in the nominal position to improve the vehicle steering experience for the driver.

Figure 5:
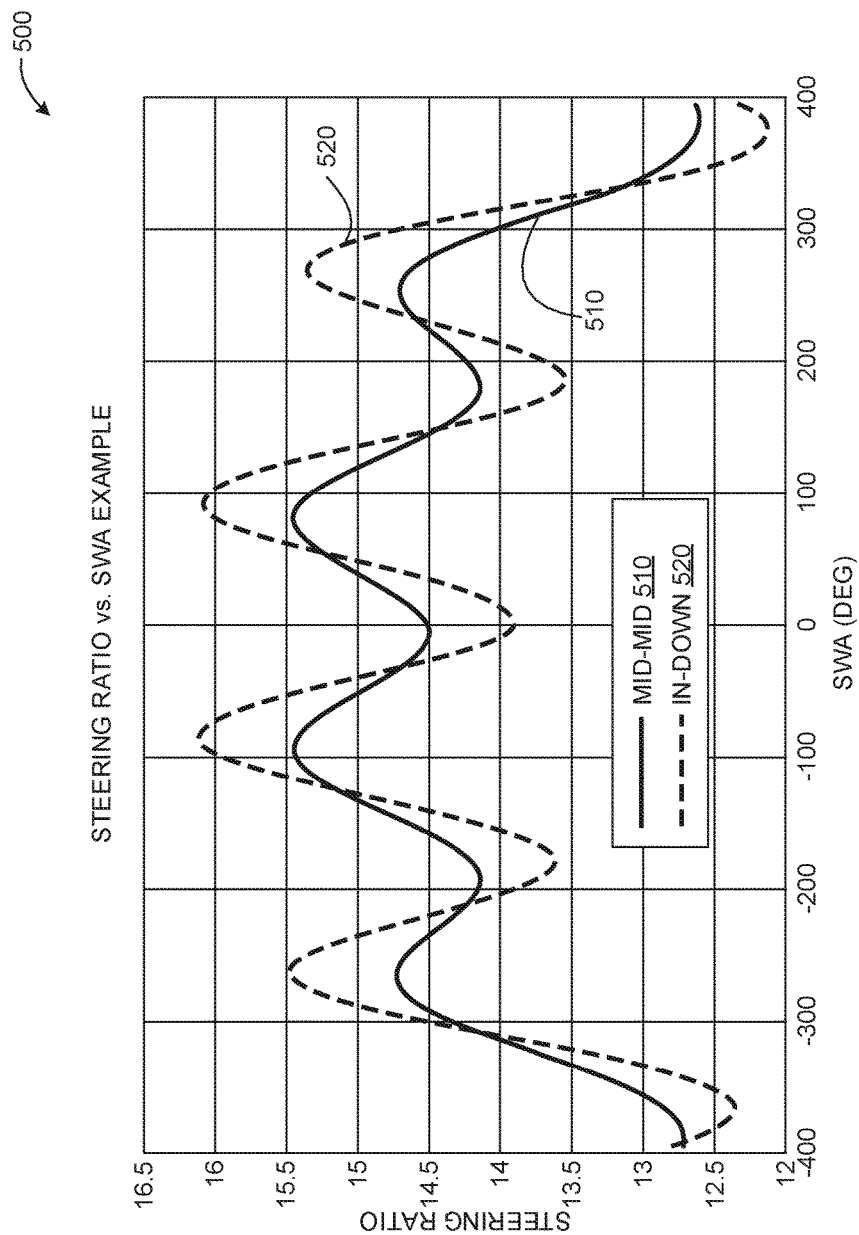
FIG. 5 is an example graph illustrating example variations in amplitude and phasing of Steering Ratio (SR) over steering wheel angle for two different steering column positions in a vehicle steering system.

FIG. 5 is an example graph 500 illustrating example variations in amplitude and phasing of Steering Ratio (SR) as a function of Steering Wheel Angle (SWA) measured in degrees (DEG) due to variations in steering column position in the vehicle steering system 100 of FIG. 1 or the vehicle steering system 200 of FIG. 2. In the illustrated example, the variations in amplitude and phasing of SR are due to changes in rake position and/or reach position of the steering wheel 102 and/or the steering column 104 of FIG. 1 or the steering column 212 of FIG. 2. The example graph 500 of FIG. 5 illustrates a SWA versus SR plot 510 (depicted via a solid line) for a steering column having a nominal (e.g., mid-mid) position (e.g., the steering column 104, 212 is neither tilted nor telescopically adjusted from the factory default position). The example graph 500 of FIG. 5 also includes an example plot 520 (depicted as a dashed-line) representative of the steering column 104, 212 in an adjusted (e.g., non-nominal) position. In the illustrated example, the plot 520 represents the steering column 104, 212 in an in-down position (e.g., the steering column 104, 212 has been moved to an "in" position relative to the nominal (mid) reach position and to a "down" position relative to the nominal (mid) rake position).

As shown in the example graph 500 of FIG. 5, the SR experienced by the driver while the steering column 104, 212 is in an adjusted (e.g., non-nominal) position (e.g., in-down) differs from the SR experienced by the driver while the steering column 104, 212 is in the nominal (e.g., mid-mid) position. The example non-uniformity manager 150 of FIGS. 1 and/or 2 compensates for the differing SR while the steering column 104, 212 is in a non-nominal position by identifying a correction factor variation over steering wheel angle (e.g., an angular offset, an active steering system overlay angle, etc.) associated with the current steering column position (e.g., the current rake position and/or the current reach position) of the steering column 104, 212. In some examples, the non-uniformity manager 150 of FIGS. 1 and/or 2 instructs the active steering system 140 of FIGS. 1 and/or 2 to compensate for (e.g., counteract) the differing SR while the steering column 104, 212 is in the non-nominal position so that the driver experiences (e.g., feels) the steering response associated with the steering column 104, 212 in the nominal position. In some instances, the non-uniformity manager 150 instructs the active steering system 140 to compensate for the differing SR while the steering column 104, 212 is in the nominal position to improve the vehicle steering experience for the driver.

Flowcharts representative of example methods for implementing the example vehicle steering system 100 of FIG. 1 or the vehicle steering system 200 of FIG. 2 are shown in FIGS. 6-10. In these examples, the methods may be implemented using machine readable instructions comprising a program for execution by a processor such as the processor 1112 shown in the example processor platform 1100 discussed below in connection with FIG. 11. The program may be embodied in software stored on a tangible computer-readable storage medium such as a CD-ROM, a floppy disk, a hard drive, a digital versatile disk (DVD), a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 6-10, many other methods of implementing the example vehicle steering system 100 of FIG. 1 or the vehicle steering system 200 of FIG. 2 may alternatively be used. For example, the order of execution of the blocks may be changed, and/or some of the blocks described may be changed, eliminated, or combined.

As mentioned above, the example methods of FIGS. 6-10 may be implemented using coded instructions (e.g., computer and/or machine readable instructions) stored on a tangible computer-readable storage medium such as a hard disk drive, a flash memory, a read-only memory (ROM), a compact disk (CD), a digital versatile disk (DVD), a cache, a random-access memory (RAM), and/or any other storage device or storage disk in which information is stored for any duration (e.g., for extended time periods, permanently, for brief instances, for temporarily buffering, and/or for caching of the information). As used herein, the term tangible computer-readable storage medium is expressly defined to include any type of computer-readable storage device and/or storage disk and to exclude propagating signals and to exclude transmission media. As used herein, "tangible computer-readable storage medium" and "tangible machine readable storage medium" are used interchangeably. Additionally or alternatively, the example methods of FIGS. 6-11 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer-readable medium is expressly defined to include any type of computer-readable storage device and/or storage disk and to exclude propagating signals and to exclude transmission media. As used herein, when the phrase "at least" is used as the transition term in a preamble of a claim, it is open-ended in the same manner as the term "comprising" is open ended. Comprising and all other variants of "comprise" are expressly defined to be open-ended terms. Including and all other variants of "include" are also defined to be open-ended terms. In contrast, the term consisting and/or other forms of consist are defined to be close-ended terms.

Figure 6:
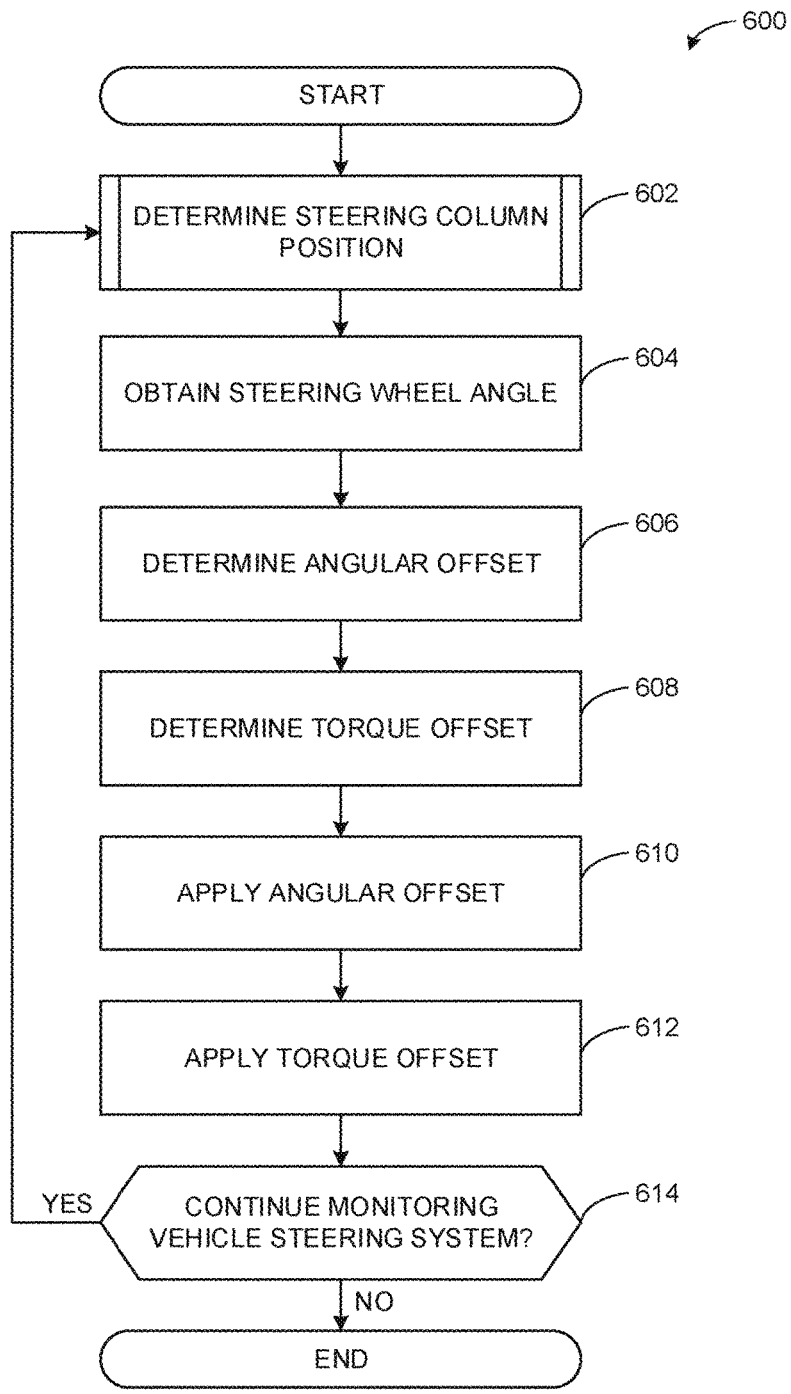
FIGS. 6-10 are flowcharts representative of example methods that may be executed by the example vehicle steering system of FIG. 1 or the example vehicle steering system of FIG. 2 to identify non-uniformity in the example vehicle steering system.

FIG. 6 is a flowchart representative of an example method 600 that may be performed by the example vehicle steering system 100 of FIG. 1 or the example vehicle steering system 200 of FIG. 2 to identify a steering column position and to improve a steering experience for a driver of a vehicle. The example method 600 begins at block 602 when the example vehicle steering system 100, 200 determines a steering column position. For example, the non-uniformity manager 150 of FIGS. 1 and/or 2 may determine a position of the steering column 212 of FIG. 2 via the column position adjusting system 202 of FIG. 2. In another example, the non-uniformity manager 150 may determine a position of the steering column 104 of FIG. 1 by determining a non-uniformity profile. At block 604, the example vehicle steering system 100, 200 obtains a steering wheel angle. For example, the non-uniformity manager 150 may obtain the steering wheel angle via the steering wheel angle sensor 152 of FIGS. 1 and/or 2.

At block 606, the example vehicle steering system 100, 200 determines an angular offset. For example, the non-uniformity manager 150 may map the steering column position and the steering wheel angle to an angular offset (e.g., an active steering system overlay angle) in a look-up table. At block 608, the example vehicle steering system 100, 200 determines a torque offset. For example, the non-uniformity manager 150 may map the steering column position, the steering wheel angle, etc. to a torque offset in a look-up table. At block 610, the example vehicle steering system 100, 200 applies the angular offset. For example, the non-uniformity manager 150 may instruct the active steering system 140 of FIGS. 1 and/or 2 to apply an active steering system overlay angle including the angular offset, where the angular offset may be applied by the active steering system actuator 142 of FIGS. 1 and/or 2. At block 612, the example vehicle steering system 100, 200 applies the torque offset. For example, the non-uniformity manager 150 may instruct the EPAS system 130 of FIGS. 1 and/or 2 to apply the torque offset to a current torque feedback.

At block 614, the example vehicle steering system 100, 200 determines whether to continue monitoring the vehicle steering system. For example, the non-uniformity manager 150 may determine that the vehicle steering system 100, 200 is powered off. If, at block 614, the example vehicle steering system 100, 200 determines to continue monitoring the vehicle steering system, control returns to block 602 to determine the steering column position and furthermore to obtain the steering wheel angle in block 604, otherwise the example method 600 concludes.

Figure 7:
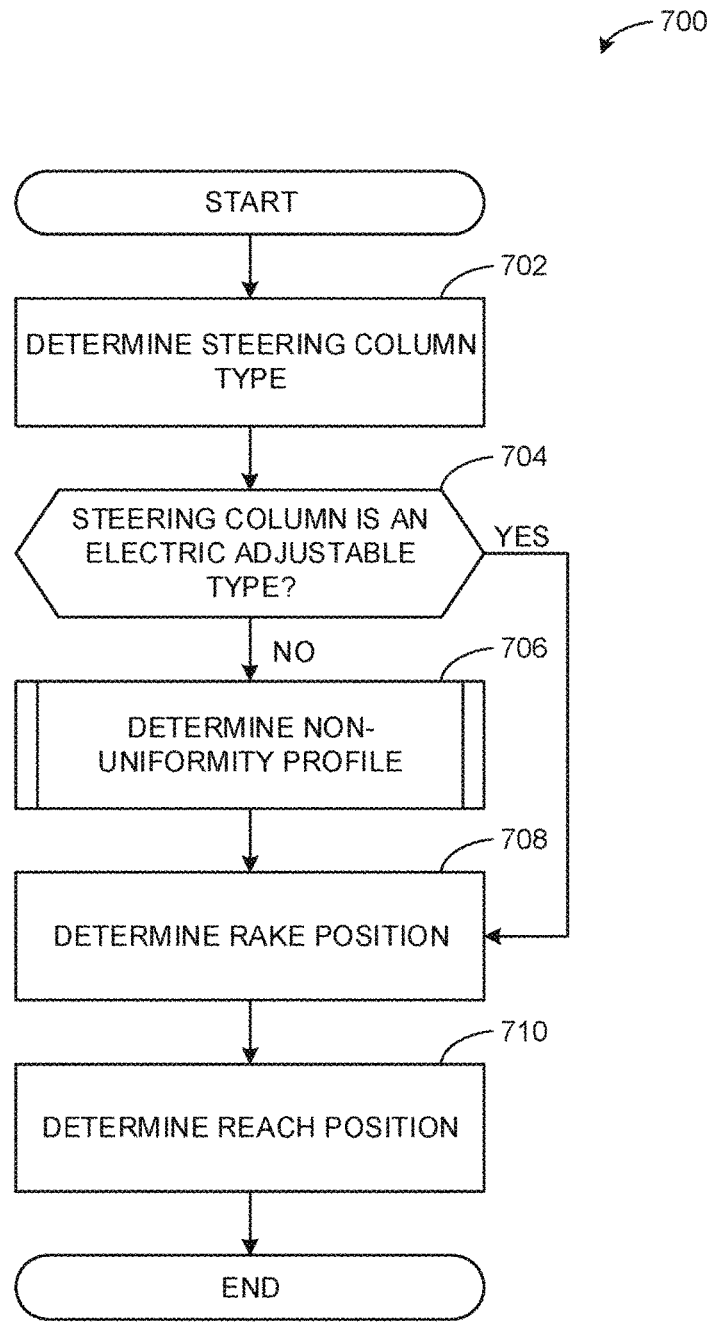

Additional detail in connection with determining a steering column position (FIG. 6 block 602) is shown in FIG. 7. FIG. 7 is a flowchart representative of an example method 700 that may be performed by the vehicle steering system 100, 200 of FIGS. 1 and/or 2 to determine a current position of a steering column (e.g., a current rake position and/or a current reach position). The example method 700 begins at block 702 when the vehicle steering system 100, 200 determines a steering column type. For example, the non-uniformity manager 150 may query a look-up table for a value of a steering column type flag to determine a steering column type. In another example, the non-uniformity manager 150 may determine a steering column type via the column position adjusting system 202 of FIGS. 1 and/or 2. For example, the column position adjusting system 202 of FIG. 2 may determine that the steering column 212 of FIG. 2 is an electrically adjustable type based on the column position adjusting system 202 including at least one of the rake linear motor 204, the reach linear motor 206, the rake position sensor 208, the reach position sensor 210, etc.

At block 704, the example vehicle steering system 100, 200 determines whether the steering column is an electrically adjustable type. For example, the non-uniformity manager 150 may determine that the steering column 212 is an electrically adjustable type via the steering column type flag, the column position adjusting system 202, etc. If, at block 704, the example vehicle steering system 100, 200 determines that the steering column is an electrically adjustable type, control proceeds to block 708 to determine a rake position of the steering column. If, at block 704, the example vehicle steering system 100, 200 determines that the steering column is not an electrically adjustable type, then, at block 706, the example vehicle steering system 100, 200 determines a non-uniformity profile. For example, the non-uniformity manager 150 may identify a non-uniformity profile and map the non-uniformity profile to a steering column position of the steering column 104 of FIG. 1.

At block 708, the operator determines a rake position of the steering column. For example, the non-uniformity manager 150 may determine the rake position of the steering column 104 of FIG. 1 based on mapping the identified non-uniformity profile to the rake position of the steering column 104. In another example, the column position adjusting system 202 may determine the rake position of the steering column 212 of FIG. 2 based on a measurement of the rake position sensor 208 of FIG. 2. At block 710, the operator determines a reach position of the steering column. For example, the non-uniformity manager 150 may determine the reach position of the steering column 104 of FIG. 1 based on mapping the identified non-uniformity profile to the reach position of the steering column 104. In another example, the column position adjusting system 202 may determine the reach position of the steering column 212 based on a measurement of the reach position sensor 210 of FIG. 2.

Figure 8:
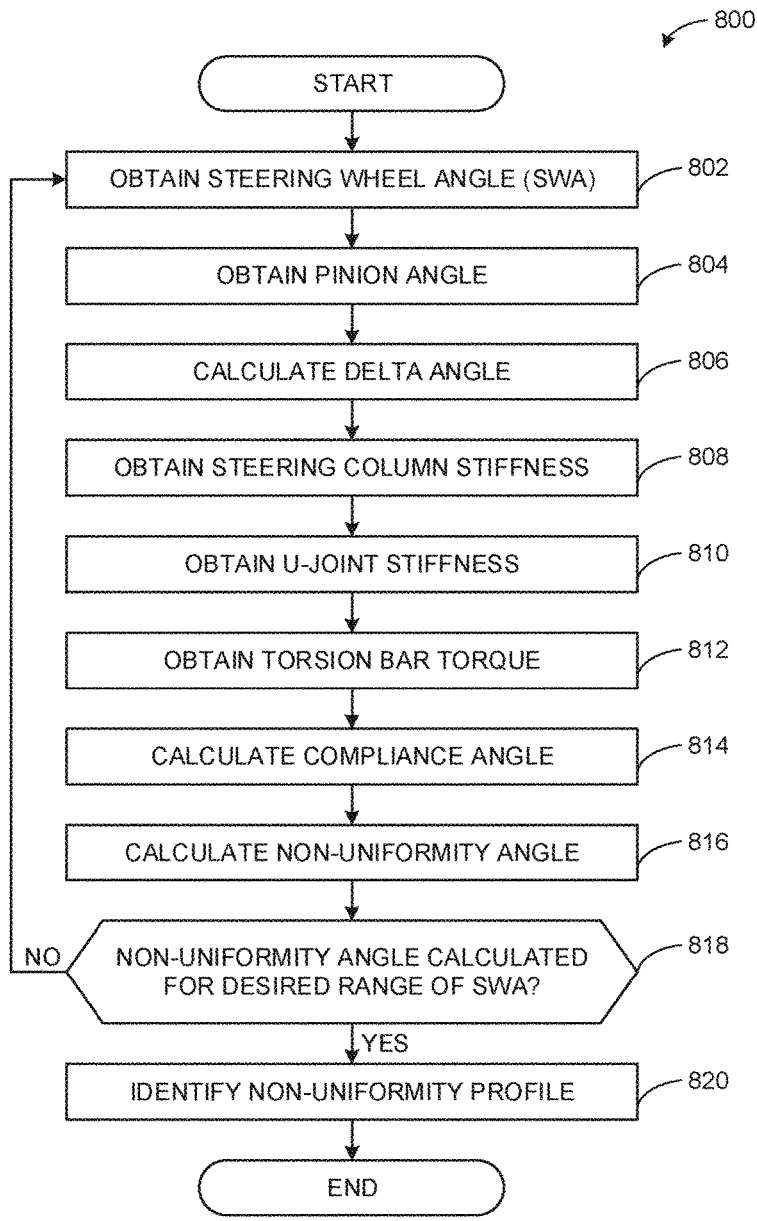

Additional detail in connection with determining a non-uniformity profile (FIG. 7 block 706) is shown in FIG. 8. FIG. 8 is a flowchart representative of an example method 800 that may be performed by the example vehicle steering system 100, 200 of FIGS. 1 and/or 2 to determine a non-uniformity profile. The example method 800 begins at block 802 when the example vehicle steering system 100, 200 obtains a steering wheel angle (SWA). For example, the non-uniformity manager 150 of FIGS. 1 and/or 2 may obtain a steering wheel angle of the steering wheel 102 of FIGS. 1 and/or 2 based on a measurement from the steering wheel angle sensor 152 of FIGS. 1 and/or 2. At block 804, the example vehicle steering system 100, 200 obtains a pinion angle. For example, the non-uniformity manager 150 may obtain the pinion angle based on a measurement from the pinion angle sensor 154 of FIGS. 1 and/or 2.

At block 806, the example vehicle steering system 100, 200 calculates a delta angle. For example, the non-uniformity manager 150 may calculate a delta angle, where the delta angle is a difference between the steering wheel angle and the pinion angle. At block 808, the example vehicle steering system 100, 200 obtains a steering column stiffness. For example, the non-uniformity manager 150 may obtain a column stiffness of the steering column 212 of FIG. 2 by mapping one or more characteristics of the steering column 212 to a look-up table, by querying an engine control unit, etc.

At block 810, the example vehicle steering system 100, 200 obtains a u-joint stiffness. For example, the non-uniformity manager 150 may obtain a u-joint stiffness of the steering column 212 by mapping one or more characteristics of the steering column 212 to a look-up table, by querying an engine control unit, etc. At block 812, the example vehicle steering system 100, 200 obtains a torsion bar torque. For example, the non-uniformity manager 150 may obtain a measurement of the torsion bar torque via the torque sensor 132 of FIGS. 1 and/or 2.

At block 814, the example vehicle steering system 100, 200 calculates a compliance angle. For example, the non-uniformity manager 150 may calculate a compliance angle based on the steering column stiffness, the u-joint stiffness, the torsion bar torque, etc. At block 816, the example vehicle steering system 100, 200 calculates a non-uniformity angle. For example, the non-uniformity manager 150 may calculate a non-uniformity angle, where the non-uniformity angle is a difference between the delta angle and the compliance angle.

At block 818, the example vehicle steering system 100, 200 determines whether a non-uniformity angle has been calculated for a desired range of steering wheel angles (SWA). For example, the non-uniformity manager 150 may determine whether a non-uniformity angle has been calculated for each steering wheel angle for a full range of −500 degrees to +500 degrees of the steering wheel 102. If, at block 818, the example vehicle steering system 100, 200 determines that a non-uniformity angle has not been calculated for a desired range of steering wheel angles, control returns to block 802 to obtain another steering wheel angle. If, at block 818, the example vehicle steering system 100, 200 determines that a non-uniformity angle has been calculated for a desired range of SWA, then, at block 820, the vehicle steering system 100, 200 identifies the non-uniformity profile. For example, the non-uniformity manager 150 may map one or more non-uniformity angles as a function of steering wheel angle to a non-uniformity profile stored in a look-up table. In the illustrated example, the mapping results in the identification of the steering column position and the steering wheel position.

Figure 9:
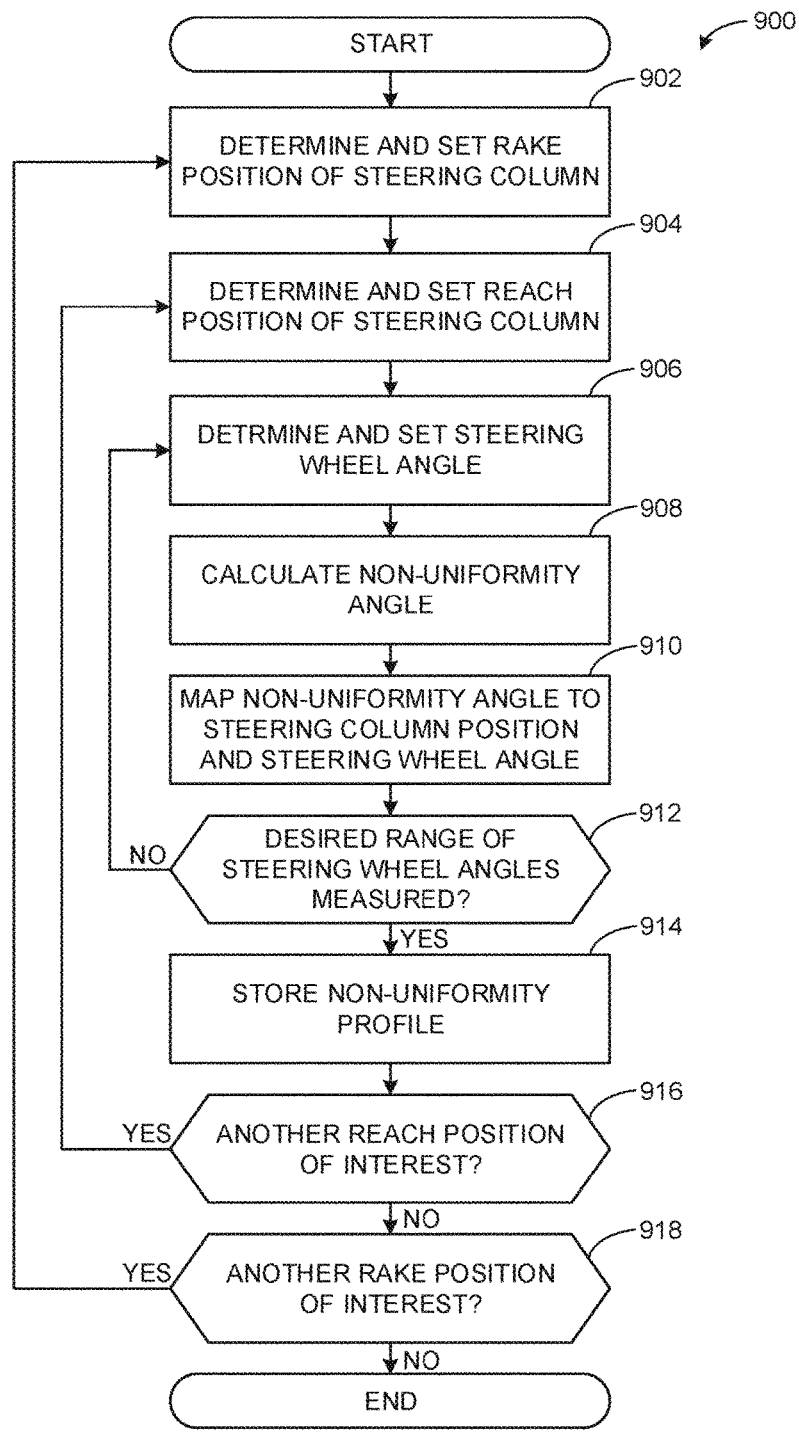

FIG. 9 is a flowchart representative of an example method 900 that may be performed by the example vehicle steering system 100, 200 of FIGS. 1 and/or 2 to generate a look-up table (e.g., a rotational velocity variation look-up table, a torque variation look-up table, etc.) during a calibration process. The example method 900 begins at block 902 when an operator determines and sets a rake position of a steering column. For example, an operator may determine a nominal rake position and set the steering column 104 of FIG. 1 to the nominal rake position. In another example, the non-uniformity manager 150 of FIGS. 1 and/or 2 may determine and set the rake position of the steering column 212 of FIG. 2 to the nominal rake position via the rake linear motor 204, the rake position sensor 208, etc.

At block 904, the operator determines and sets a reach position of the steering column. For example, the operator may determine a nominal reach position and set the steering column 104 to the nominal reach position. In another example, the non-uniformity manager 150 may determine and set the reach position of the steering column 212 to the nominal reach position via the reach linear motor 206, the reach position sensor 210, etc.

At block 906, the operator determines and sets a steering wheel angle. For example, the operator may determine a nominal steering wheel position (e.g., a center position) of the steering wheel 102 of FIGS. 1 and/or 2 and set the steering wheel 102 to the nominal steering wheel position. In another example, the non-uniformity manager 150 may determine a nominal steering wheel position and set the steering wheel 102 to the nominal steering wheel position via the EPAS system 130. Alternatively, the example non-uniformity manager 150 may set the steering wheel 102 via the active steering system actuator 142 when the operator or an external machine holds the steering wheel 102 fixed. Alternatively, the example non-uniformity manager 150 may set the steering wheel 102 by transmitting a command to an external machine operatively coupled to the steering wheel 102.

At block 908, the example vehicle steering system 100, 200 calculates a non-uniformity angle. For example, the non-uniformity manager 150 may calculate a non-uniformity angle in accordance with blocks 802, 804, 806, 808, 810, 812, 814, 816 of FIG. 8. At block 910, the example vehicle steering system 100, 200 maps the non-uniformity angle to the steering column position and the SWA. For example, the non-uniformity manager 150 may map the non-uniformity angle to the steering column position and the steering wheel angle in a look-up table.

At block 912, the example vehicle steering system 100, 200 determines whether a desired range of steering wheel angles (SWA) have been measured. For example, the non-uniformity manager 150 may determine whether a non-uniformity angle has been determined for each angle of a full range of SWA (e.g., from −500 degrees to +500 degrees) of the steering wheel 102. If, at block 912, the example vehicle steering system 100, 200 determines that a desired range of steering wheel angles have not been measured, control returns to block 906 to determine and set another steering wheel angle. If, at block 912, the example vehicle steering system 100, 200 determines that a desired range of steering wheel angles have been measured, then, at block 914, the vehicle steering system 100, 200 stores a non-uniformity profile. For example, the non-uniformity manager 150 may store a rotational velocity variation profile as a function of steering wheel angle in a look-up table.

At block 916, the example vehicle steering system 100, 200 determines whether there is another reach position of interest. For example, the operator and/or the non-uniformity manager 150 may determine that there is another reach position of interest. If, at block 916, the example vehicle steering system 100, 200 determines that there is another reach position of interest, control returns to block 904 to determine and set another reach position of the steering column. If, at block 916, the example vehicle steering system 100, 200 determines that there is not another reach position of interest, then, at block 918, the vehicle steering system 100, 200 determines whether there is another rake position of interest. For example, the operator and/or the non-uniformity manager 150 may determine that there is another rake position of interest. If, at block 918, the example vehicle steering system 100, 200 determines that there is another rake position of interest, control returns to block 902 to determines and set another rake position of the steering column, otherwise the example method 900 concludes.

Figure 10:
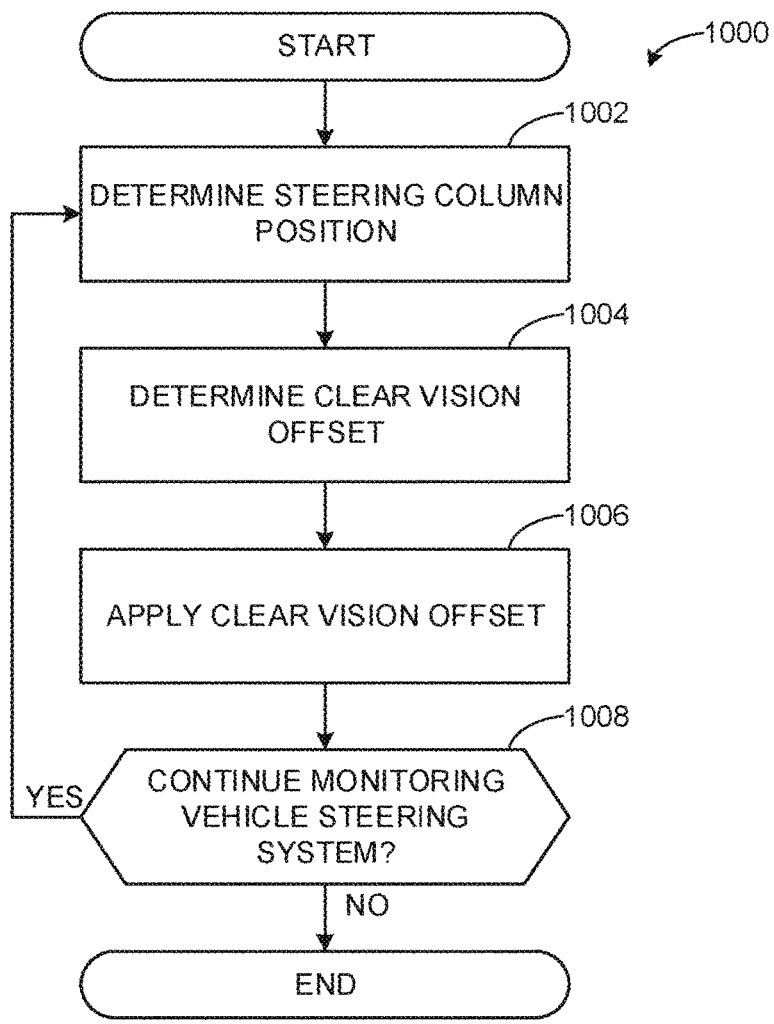

FIG. 10 is a flowchart representative of an example method 1000 that may be performed by the example vehicle steering system 100, 200 of FIGS. 1 and/or 2 to compensate for a clear vision error. The example method 1000 begins at block 1002 when the example vehicle steering system 100, 200 determines a steering column position. For example, the non-uniformity manager 150 of FIGS. 1 and/or 2 may determine a position of the steering column 104 of FIG. 1 or the steering column 212 of FIG. 2 by performing the example method 700 of FIG. 7. For example, the non-uniformity manager 150 may determine a position of the steering column 104 by mapping a non-uniformity profile to a steering column position of the steering column 104. In another example, the non-uniformity manager 150 may determine a position of the steering column 212 via the column position adjusting system 120 of FIG. 2.

At block 1004, the example vehicle steering system 100, 200 determines a clear vision offset. For example, the non-uniformity manager 150 may determine an overlay angle for the active steering system 140 based on the steering column position. At block 1006, the example vehicle steering system 100, 200 applies a clear vision angular offset. For example, the non-uniformity manager 150 may instruct the active steering system 140 of FIGS. 1 and/or 2 to apply a clear vision angular offset to an active steering system overlay angle via the active steering system actuator 142 of FIGS. 1 and/or 2.

At block 1008, the example vehicle steering system 100, 200 determines whether to continue monitoring the vehicle steering system. For example, the non-uniformity manager 150 may determine that the vehicle steering system 100, 200 is powered off. If, at block 1008, the example vehicle steering system 100, 200 determines to continue monitoring the vehicle steering system, control returns to block 1002 to determine the steering column position, otherwise the example method 1000 concludes.

Figure 11:
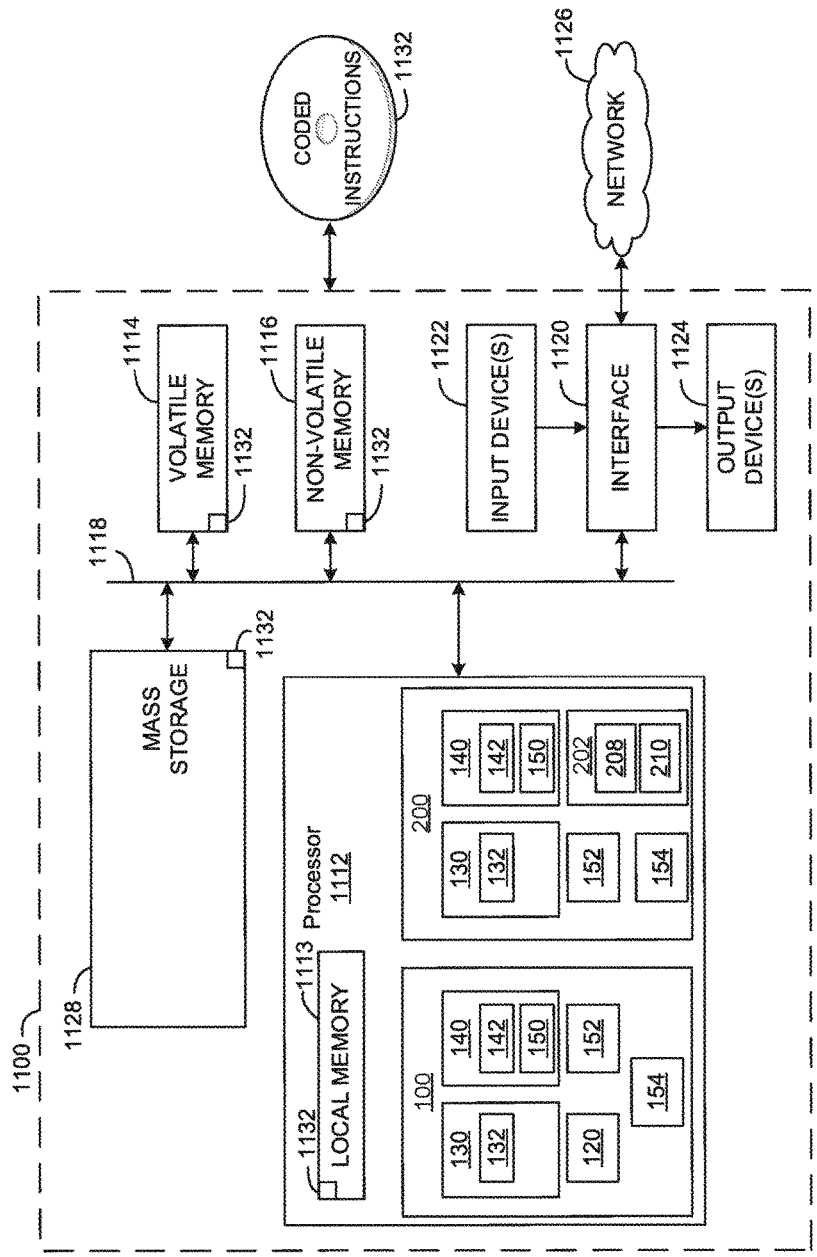
FIG. 11 is a block diagram of an example processing platform structured to execute machine-readable instructions to implement the methods of FIGS. 6-10 and/or the example vehicle steering system of FIG. 1, and/or the example vehicle steering system of FIG. 2.

FIG. 11 is a block diagram of an example processor platform 1100 capable of executing instructions to implement the methods of FIGS. 6-10 and the vehicle steering system 100 of FIG. 1 and/or the vehicle steering system 200 of FIG. 2. The processor platform 1100 can be, for example, an engine control unit, an automotive computer, a server, a personal computer, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors or controllers from any desired family or manufacturer.

The processor 1112 of the illustrated example includes a local memory 1113 (e.g., a cache). The processor 1112 of the illustrated example executes the instructions to implement the example column position adjusting system 120, the example EPAS system 130, the example torque sensor 132, the example active steering system 140, the example active steering system actuator 142, the example non-uniformity manager 150, the example steering wheel angle sensor 152, the example pinion angle sensor 154, the example column position adjusting system 202, the example rake position sensor 208, and/or the example reach position sensor 210. The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 11116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint, and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1120 of the illustrated example, thus, typically includes a graphics driver card, a graphics driver chip, or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1100 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives. The mass storage device 1128 implements the one or more look-up tables described herein.

Coded instructions 1132 to implement the methods represented by the flowcharts of FIGS. 6-10 may be stored in the mass storage device 1128, in the volatile memory 1114, in the non-volatile memory 1116, and/or on a removable tangible computer-readable storage medium such as a CD or DVD.

From the foregoing, it will be appreciated that the above disclosed methods, apparatus, and articles of manufacture enable identifying non-uniformities in a vehicle steering system. For example, disclosed examples identify non-uniformity in a vehicle steering system when a steering wheel is adjusted from a nominal position. By identifying the non-uniformity introduced by adjusting the steering wheel from the nominal position, disclosed examples determine a current reach position and a current rake position of the steering wheel, thereby enabling a determination of angular offsets (e.g., to correct for a rotational velocity variation, to correct a clear vision error, etc.) and/or torque offsets that may be applied by the vehicle steering system to compensate for the determined non-uniformity.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a first sensor to measure a current position of a steering column of a vehicle;
a second sensor to measure a first position of a steering wheel of the vehicle;
a logic circuit to map the current position to a steering wheel offset; and
an active steering system to apply the steering wheel offset to adjust the steering wheel to a second position different from the first position.

2. The apparatus of claim 1, further including a column position adjusting system to determine a type of the steering column.

3. The apparatus of claim 2, wherein the type is a manually adjustable type or an electrically adjustable type.

4. The apparatus of claim 1, wherein the first sensor is to measure a rake position of the steering column and the second sensor is to measure a reach position of the steering column.

5. The apparatus of claim 1, wherein the steering wheel offset is a clear vision angular offset, the clear vision angular offset to be applied to an active steering system overlay angle.

6. The apparatus of claim 1, wherein the active steering system is to apply the steering wheel offset to an active steering system actuator.

7. An apparatus comprising:
a first sensor and a second sensor to determine a non-uniformity angle associated with a steering column in a vehicle steering system;
a logic circuit to:
map the non-uniformity angle to a current position of the steering column; and
determine an offset based on the current position of the steering column; and
an active steering system to apply the offset to adjust a current position of a steering wheel to a nominal position of the steering wheel to compensate for a clear vision error.

8. The apparatus of claim 7, further including a third sensor to determine a torque feedback variation associated with the steering column.

9. The apparatus of claim 8, wherein the logic circuit is to map the torque feedback variation to the current position of the steering column.

10. The apparatus of claim 7, further including a column position adjusting system to determine a steering column type of the steering column.

11. The apparatus of claim 7, wherein the first sensor is to measure a first angle corresponding to a steering wheel angle relative to a first universal joint, the second sensor is to measure a second angle corresponding to a pinion angle relative to a second universal joint, and the non-uniformity angle is based on the first angle and the second angle.

12. The apparatus of claim 7, wherein the active steering system is to apply the offset to an active steering system actuator to compensate for the clear vision error.

13. A method comprising:
determining, by executing an instruction with one or more processors, a type of a steering column in a vehicle steering system;
in response to determining the type is a manually adjustable type:
determining, by executing an instruction with the one or more processors, a non-uniformity angle associated with the steering column; and
mapping, by executing an instruction with the one ore more processors, the non-uniformity angle to a current position of the steering column;
mapping, by executing an instruction with the one or more processors, the current position of the steering column to an offset to adjust a current position of a steering wheel; and
applying, by executing an instruction with the one or more processors, the offset to an active steering system to adjust the current position of the steering wheel to a nominal position of the steering wheel to compensate for a clear vision error.

14. The method of claim 13, further including in response to determining that the type is an electrically adjustable type, determining the current position of the steering column based on a measurement from a first sensor and a second sensor.

15. The method of claim 14, wherein the first sensor measures a rake position of the steering column and the second sensor measures a reach position of the steering column.

16. The method of claim 13, wherein mapping the non-uniformity angle to the current position includes mapping the non-uniformity angle to a non-uniformity profile in a look-up table.

17. The method of claim 16, wherein the look-up table is generated by determining non-uniformity angles as a function of a steering wheel angle for a plurality of steering column positions.

18. The method of claim 13, wherein the offset is a clear vision angular offset, the clear vision angular offset to be applied to an active steering system overlay angle.

19. The method of claim 18, wherein the non-uniformity angle is a first non-uniformity angle, and determining the clear vision angular offset includes comparing a first velocity variation associated with the first non-uniformity angle at the current position of the steering wheel to a second velocity variation associated with a second non-uniformity angle at the nominal position of the steering wheel.

20. The method of claim 13, wherein the offset is applied to an active steering system actuator.

* * * * *

UNITED STATES PATENT AND TRADEMARK OFFICE
CERTIFICATE OF CORRECTION

PATENT NO. : 10,315,691 B2
APPLICATION NO. : 15/474744
DATED : June 11, 2019
INVENTOR(S) : Lodewijk Wijffels et al.

It is certified that error appears in the above-identified patent and that said Letters Patent is hereby corrected as shown below:

In the Claims

Column 28, Line 63 (Claim 5): Replace "offset to" with --offset is to--.

Column 30, Line 1 (Claim 13): Replace "ore" with --or--.

Signed and Sealed this
Third Day of September, 2019

Andrei Iancu
*Director of the United States Patent and Trademark Office*